United States Patent [19]
Noe et al.

[11] Patent Number: 5,497,615
[45] Date of Patent: Mar. 12, 1996

US005497615A

[54] GAS TURBINE GENERATOR SET

[76] Inventors: James C. Noe, 23650 Community St., West Hills, Calif. 91304; Robert D. McKeirnan, Jr., 8300 Manitoba St. #210, Playa del Rey, Calif. 90293

[21] Appl. No.: 180,881

[22] Filed: Mar. 21, 1994

[51] Int. Cl.$^6$ ........................................................ F02C 7/10
[52] U.S. Cl. ................................................... 60/39.511
[58] Field of Search ............................ 60/39.511, 39.36, 60/266; 165/166, 909

[56] References Cited

U.S. PATENT DOCUMENTS

| | | |
|---|---|---|
| 2,368,732 | 2/1945 | Wallgren . |
| 2,656,677 | 10/1953 | Peterson . |
| 2,925,714 | 2/1960 | Cook . |
| 2,939,686 | 6/1960 | Wildermuth . |
| 3,118,278 | 1/1964 | Hill . |
| 3,368,616 | 2/1968 | Adams et al. . |
| 3,507,115 | 4/1970 | Wisoka . |
| 3,880,232 | 4/1975 | Parker . |
| 4,073,340 | 2/1978 | Parker . |
| 4,098,330 | 7/1978 | Flower et al. . |
| 4,132,064 | 1/1979 | Kumm . |
| 4,141,672 | 2/1979 | Wieland et al. . |
| 4,180,973 | 1/1980 | Förster et al. . |
| 4,197,699 | 4/1980 | Parker et al. . |
| 4,209,979 | 7/1980 | Woodhouse et al. . |
| 4,263,964 | 4/1981 | Masai et al. . |
| 4,266,401 | 5/1981 | Sumegi et al. . |
| 4,269,027 | 5/1981 | Mattson . |
| 4,274,253 | 6/1981 | Bolliger et al. . |
| 4,275,558 | 6/1981 | Hatch et al. . |
| 4,291,754 | 9/1981 | Morse et al. . |
| 4,295,689 | 10/1981 | Licht .................................. 308/9 |

(List continued on next page.)

FOREIGN PATENT DOCUMENTS

| | | | |
|---|---|---|---|
| 420872 | 5/1948 | Italy ................................. | 60/39.511 |
| 02146 | 2/1991 | WIPO ............................... | 60/39.511 |

OTHER PUBLICATIONS

High Efficiency, Low Cost, Small Gas Turbines Mackay & Noe ASME Sep., 1991.
Gas Turbine Generator Sets for Hybrid Vehicles Mackay SAE Feb., 1992.
Micro-Gas Turbine Generator Sets for Cogeneration Mackay GLOBALCON Mar., 1992.
Ultra Low Emission Hybrid Vehicles Using Micro Gas Turbines and Bipolar Batteries Mackay, et al. ISATA Jun., 1992.
Hybrid Vehicles Gas Turbines Mackay SAE Mar., 1993.
Air Cycle Heat Pumps Mackay GLOBALCON Apr., 1993.

*Primary Examiner*—Timothy S. Thrope
*Attorney, Agent, or Firm*—Cislo & Thomas

[57] ABSTRACT

A small gas turbine generator set comprising a rotating group and combustor contained within a circumferential recuperator. The rotating group comprises an alternator rotor on a common shaft with a turbine wheel and compressor impeller, supported by double acting complaint foil thrust bearings and a radial compliant foil bearing. The circumferential recuperator consists of a plurality of apertured boundary foils having embossments for structurally spacing the foils apart, arranged to provide the flow channels, manifolds, and structure to permit the existence of differential pressure between each surface of the foil. The circumferential recuperator is unitarily constructed surrounding the rotating group and combustor wherein the inflowing air is heated by the recuperator before entering the combustor. Due to the intercompatibility and modularity of the components, the air flow path associated with the compressor discharge and the turbine inlet is formed upon installation of the rotating group and the recuperator and by final assembly of the combustor unit which forms a final enclosure for the turbine inlet air. The configuration of the circumferential recuperator provides improvement in engine performance by improving heat transfer effectiveness and additionally acts to absorb sound as well as to safely insulate the surrounding environment should the rotating group fail and be centrifugally driven outside of its primary containment.

4 Claims, 32 Drawing Sheets

U.S. PATENT DOCUMENTS

| | | |
|---|---|---|
| 4,310,960 | 1/1982 | Parker . |
| 4,331,352 | 5/1982 | Graves . |
| 4,347,711 | 9/1982 | Noe et al. . |
| 4,352,273 | 10/1982 | Kinsell et al. . |
| 4,375,745 | 3/1983 | Schelp . |
| 4,377,025 | 3/1983 | Masai et al. . |
| 4,458,866 | 6/1984 | Graves . |
| 4,470,453 | 9/1984 | Laughlin . |
| 4,503,683 | 3/1985 | Wieland et al. . |
| 4,511,106 | 4/1985 | Graves . |
| 4,974,413 | 12/1990 | Szego . |
| 4,993,223 | 2/1991 | Kretzinger . |
| 5,004,044 | 4/1991 | Horgan et al. ............ 60/39.511 |
| 5,050,668 | 9/1991 | Peterson et al. . |
| 5,065,816 | 11/1991 | Darragh . |
| 5,081,834 | 1/1992 | Darragh . |
| 5,082,050 | 1/1992 | Darragh . |
| 5,388,398 | 2/1995 | Kadambi et al. ............ 60/39.511 |

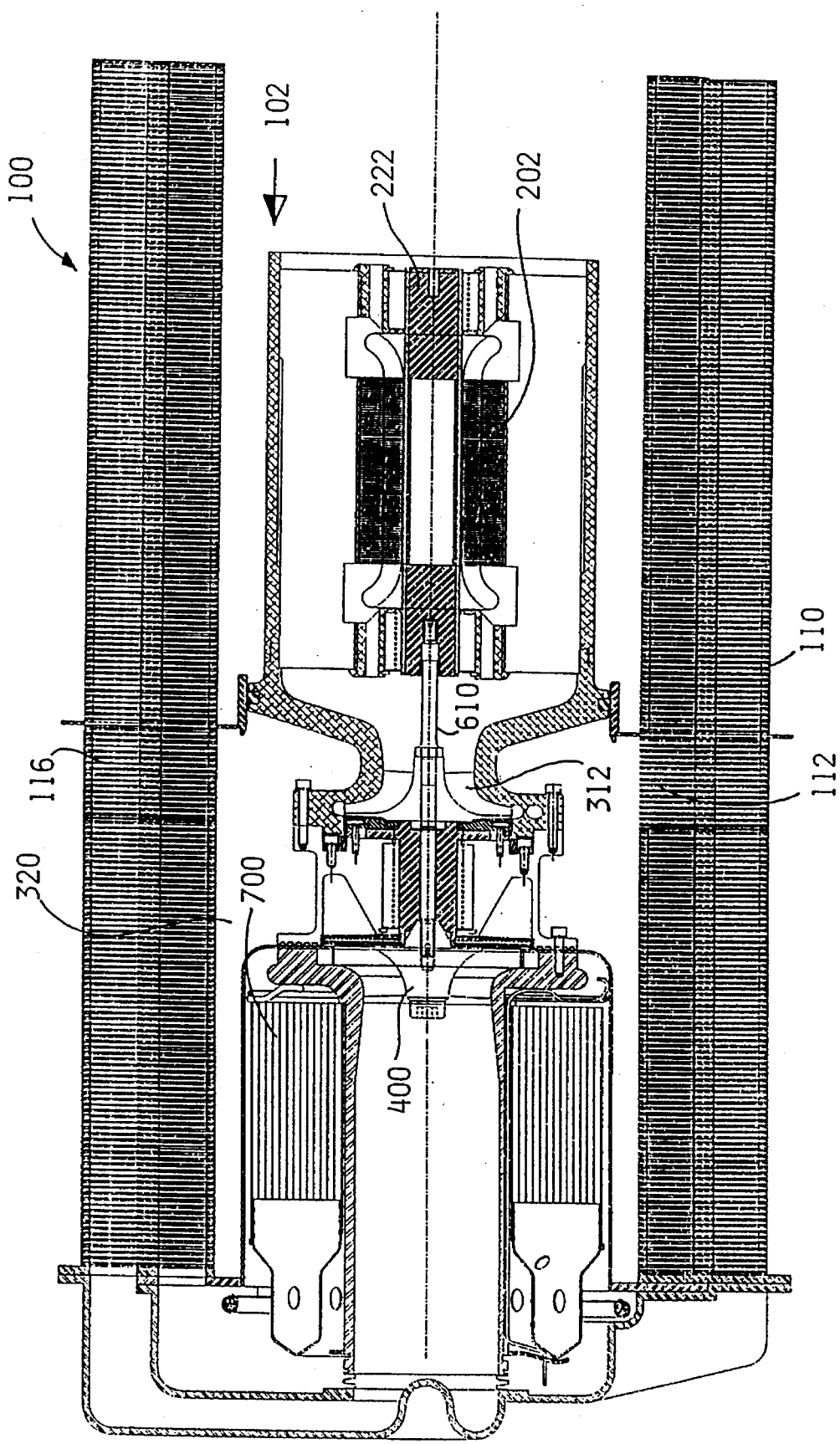

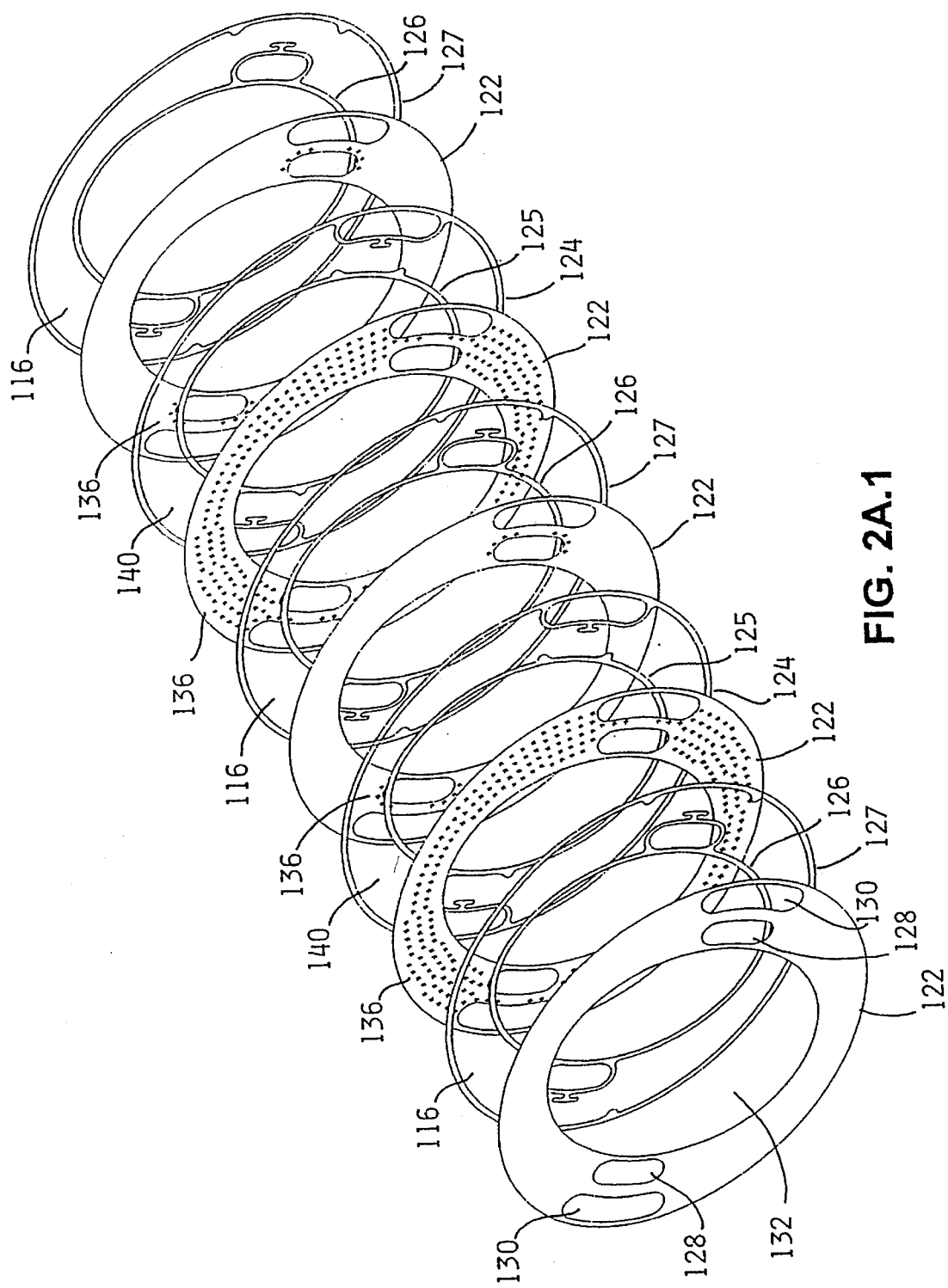
FIG. 2A.1

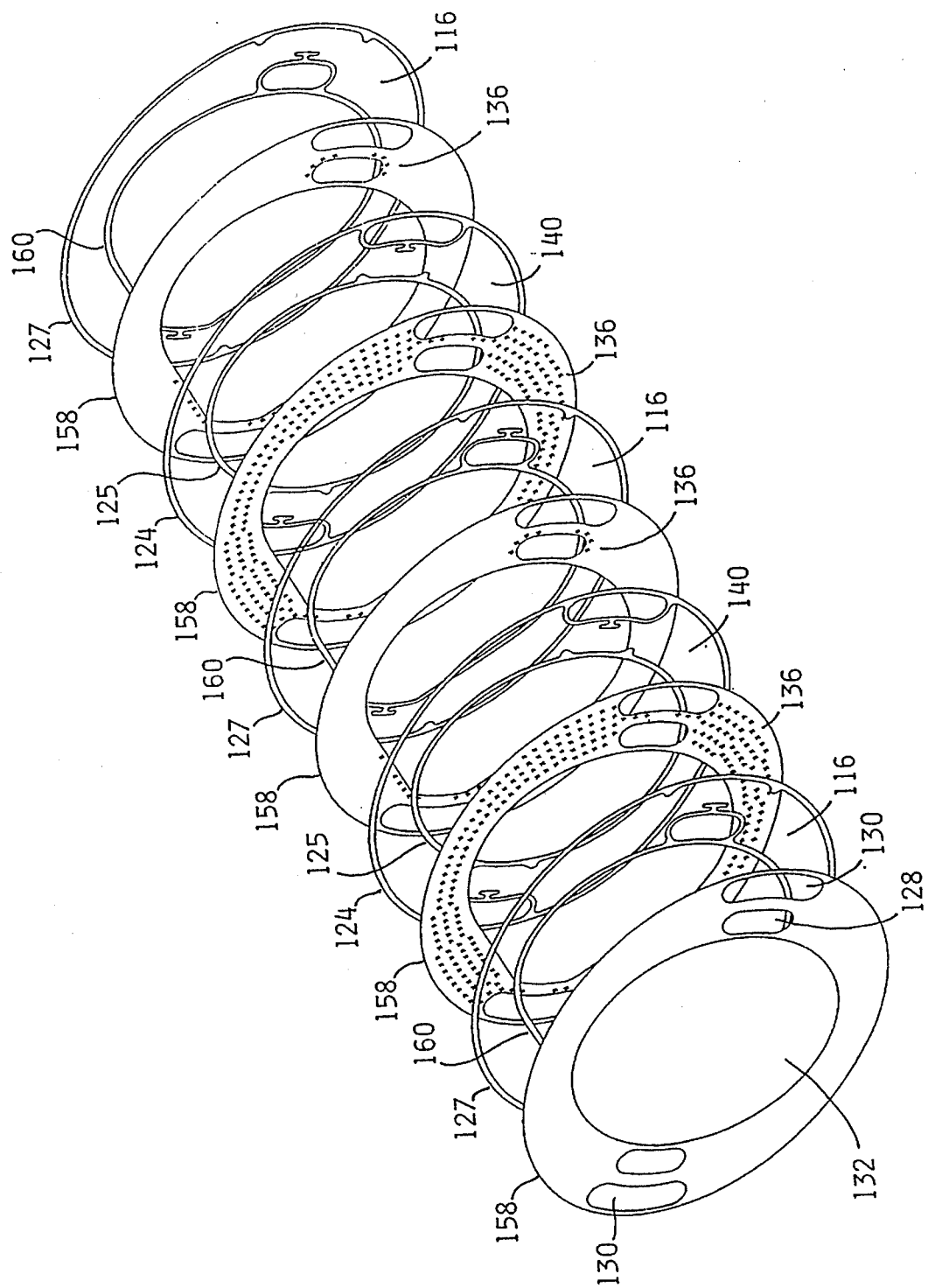
FIG. 2A.2

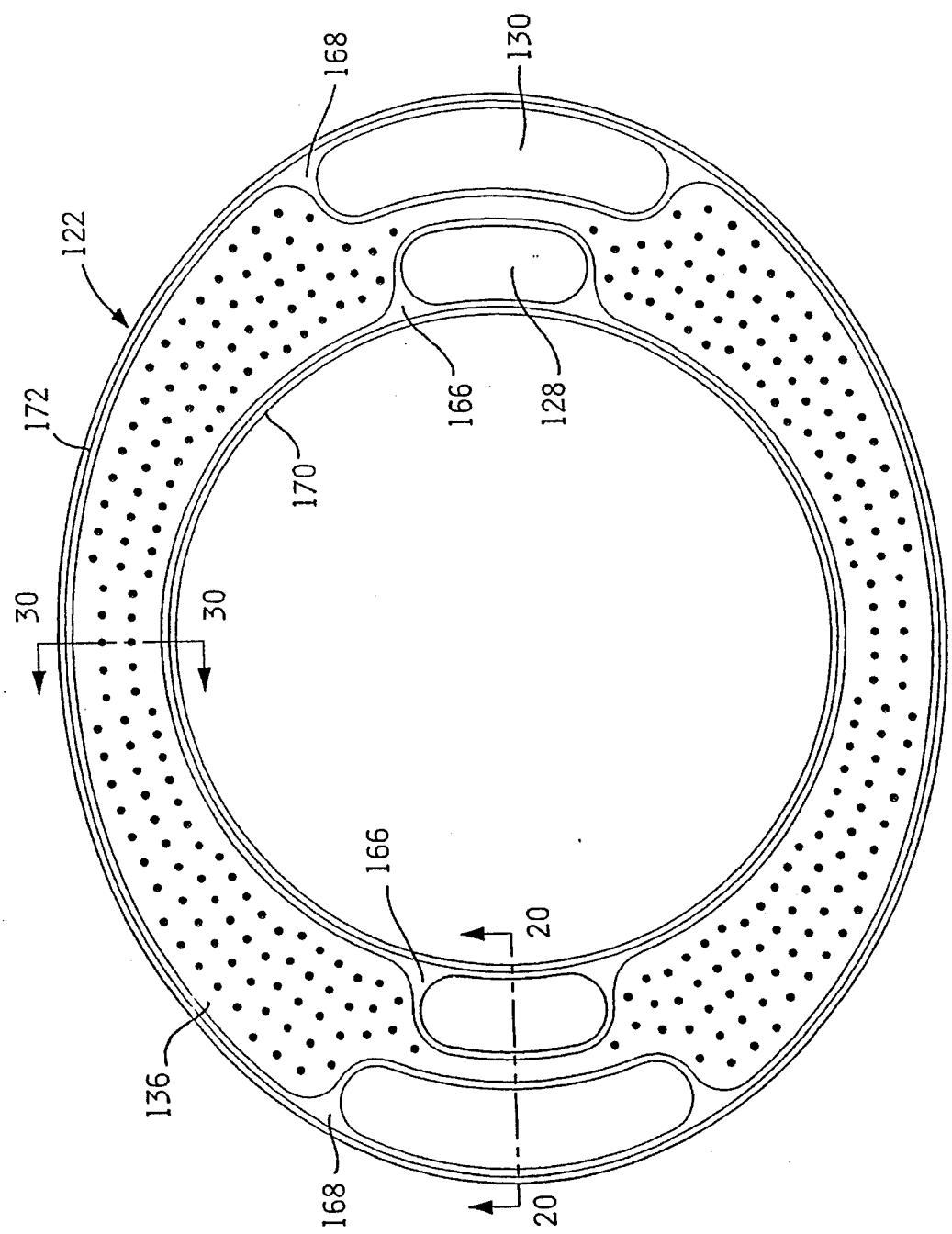

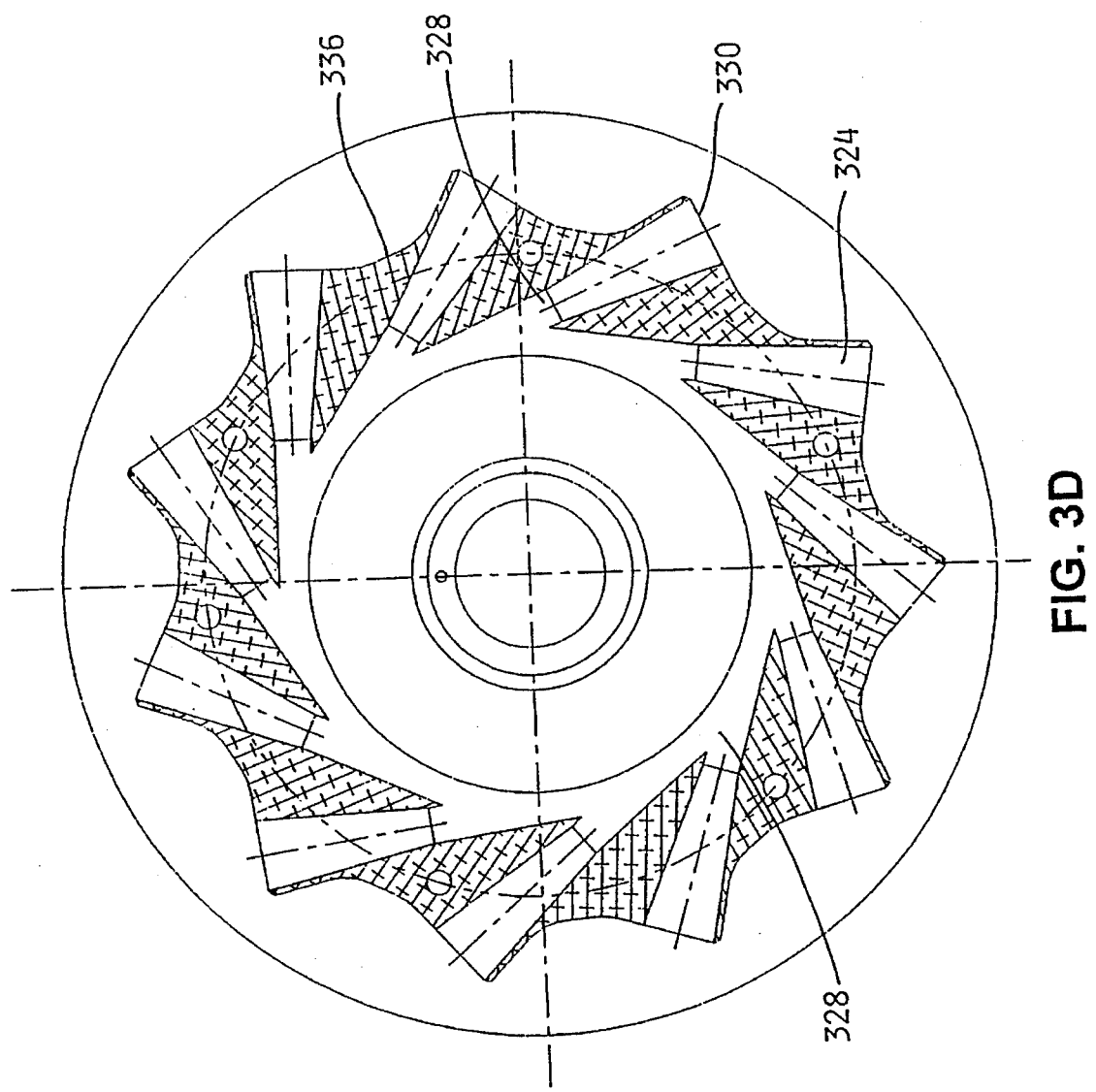

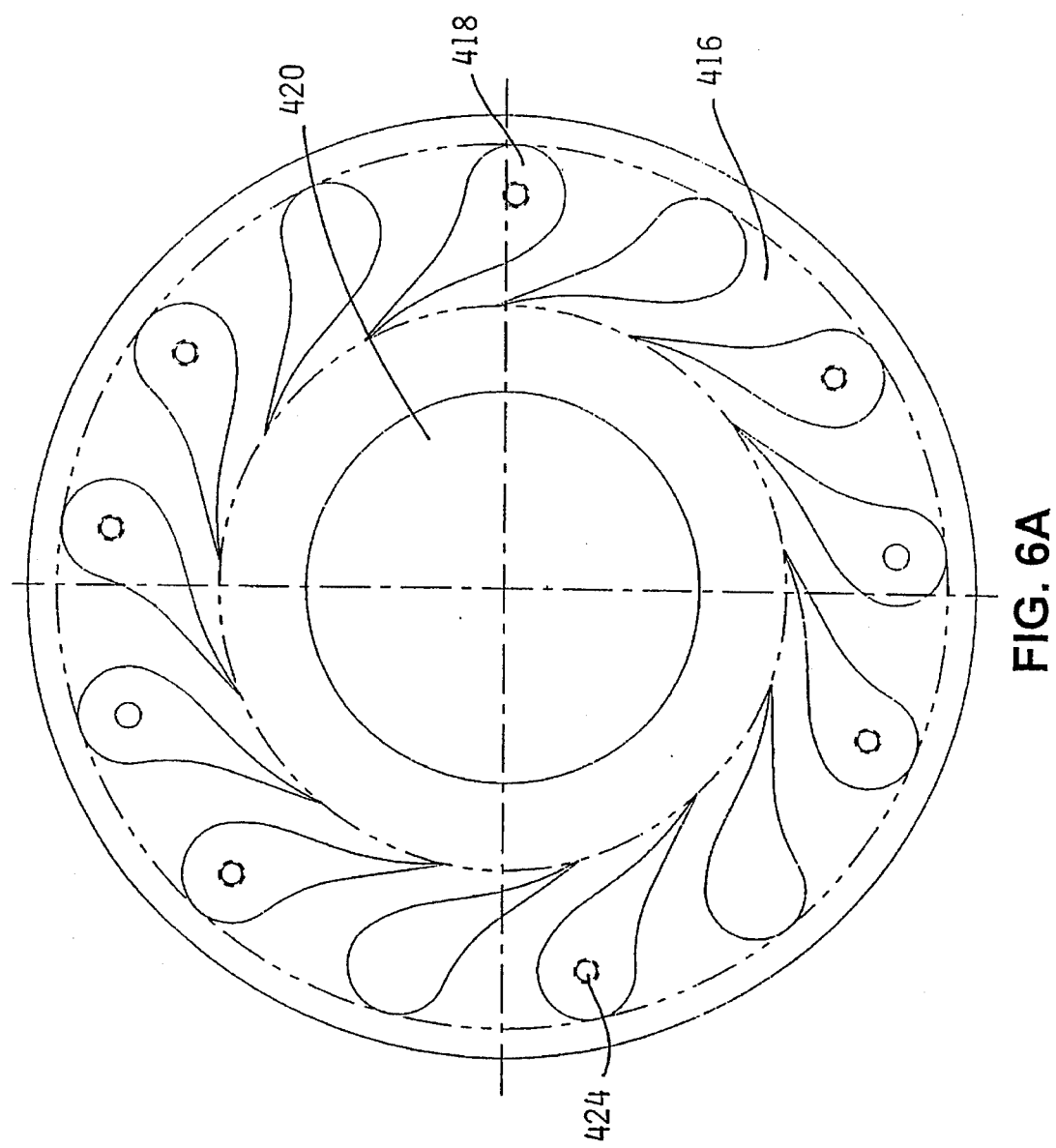

GAS TURBINE GENERATOR SET

TECHNICAL FIELD

The invention relates to improvements in electric power generation, using a highly efficient compact small gas turbine driven generator set in conjunction with batteries, flywheels or other means of energy storage. This system provides the power requirements for a multitude of applications, ranging from self-propelled vehicles to stand alone generator sets for providing economical electrical power.

BACKGROUND OF THE INVENTION

The efficiency of compact gas turbine engines has been demonstrated in non-military vehicular applications involving automobiles, buses, and trucks. Companies such as Ford, General Motors, Chrysler, BMW, Mercedes Benz, Rover, Garret and others have built and tested them. However, because of cost of the gas turbine and the associated installation costs, no one has been able to place them in large scale commercial automotive production. Only the military has been able to afford such engine systems to date.

Electric vehicles are now being mandated by law. In 1998, 2% of all vehicles delivered in the State of California by manufacturers selling more than 35,000 vehicles per year must have "zero" pollutant emissions. In the years 2001 and 2003, the zero emission requirement increases to 5 and 10%, respectively. These "zero" emission vehicles are presumed to be electrically powered, since power from batteries does not produce NOx, CO or hydrocarbons emissions.

The problem with the electric vehicle is that it does not have adequate range when powered by batteries that are currently available. As the re-charge time requires several hours, electric vehicles are impractical for extended distance driving. If air conditioning or heating is needed the range can be further reduced by up to a third or more. Accordingly, the hybrid electric vehicle, using an auxiliary power unit, in the form of a small gas turbine generator set, may be used as a second source of electrical energy in association with the battery.

In the most basic version of this type of hybrid electric vehicle, the small gas turbine generator set is a range extender. The vehicle uses the batteries to provide electricity for normal driving. On days when the vehicle is only driven for short distances, such as back and forth to work or on shopping expeditions, the small gas turbine would not be started. However, when the battery is discharged to some pre-determined limit, the gas turbine generator set would start and extend the range. Indeed, if the gas turbine generator set has adequate power, the range can equal that of a conventional vehicle even if air conditioning or heating is needed.

However, the majority of small gas turbine engines utilize a design approach that is inherently expensive. Virtually all gas turbine engines that have actually been demonstrated on the road use free turbine drives and multi-speed reduction gear boxes with reverse capabilities to transmit power. Virtually all of them have secondary auxiliary gear boxes for a wide variety of engine driven accessories. All have complete and complex lubrication systems with pumps, oil coolers, sumps, etc. All have complex control systems to govern the speeds of two separate rotors and allow maximum gas producer rotor acceleration without overheating. Many incorporate variable geometries in the compressor diffusers or the turbine nozzles to improve response time and to enhance part load performance. Some use power transfer clutches. Gas turbine engines for automotive applications have used rotary regenerators to improve the engine efficiency. These regenerators are very expensive and have an inherent problem with seal leakage.

Thus, there is a need for a power source using a small gas turbine engine. Also for a power source which has no gear box, no lubrication system, no liquid coolants and no engine driven accessories. Additionally, there is a need for a power source which is affordable, compact, and provides a light weight power package with low emissions that can be used to generate electricity and to extend the range of electric vehicles to equal or exceed those of conventional cars, trucks and buses.

The subject invention herein solves all of these problems in a new and unique manner at economically affordable costs. Some related patents directed to gas turbine engines and recuperators are described below:

U.S. Pat. No. 5,082,050 issued to C. T. Darragh on Jan. 21, 1992

This patent discloses a circular heat exchanger designed to increase the efficiency of an engine by utilizing the heat from the exhaust gas to pre-heat the intake air. The circular heat exchanger comprises a plurality of evenly spaced individual tension rings which are positioned about the outer portion of the core of the heat exchanger, and a plurality of compressive hoops which as positioned at the inner portion of the core, thereby resisting the forces which are attempting to separate the heat exchanger passages. The rings and the hoops are in contact with the core providing heat transferring relationship with the donor fluid. The rings further expand and contract in response to the temperature changes of the donor fluid, and maintain a pre-established force on the core of the heat exchanger.

U.S. Pat. No. 4,993,223 issued to K. Kretzinger on Feb. 19, 1991

This patent describes a circumferential recuperator for use with a turbine engine. The circumferential recuperator is constructed from a plurality of stacked formed plates, alternately sandwiching radially aligned exhaust passageways, with partially circumferentially aligned air passageways, in heat exchange relationship. The air passageways further contain generally Z-shaped fin passageways inter-connecting actually aligned inlet and outlet manifolds within the annular core of the recuperator.

U.S. Pat. No. 4,470,453 issued to R Laughlin, et al Sep. 11, 1984

This patent describes a heat exchange apparatus having a plurality of plates through which heat is exchanged from a first gas to a second gas, and is provided with a plurality of plates having first and second opposing patterns. Each of the opposing patterns is provided with a plurality of sinusoidally varying surface strips, whereby the second gas flows in a generally sinusoidal path in a first direction along a first side of the first and second patterns between the first and second plates and the first gas flows in a generally sinusoidal path in a direction opposite the first direction along the other side of the first and second plates. The first and second patterns are provided with sealing ridges in abutting relationship, the sealing ridges so disposed to provide an inlet and outlet for the second gas when the plates are mounted in the heat exchange apparatus.

U.S. Pat. No. 2,368,732 issued to A. G. Wallgren on Feb. 6, 1945

This patent describes a water cooler for use in connection with internal combustion engines, and is designed to carry off large quantities of heat energy, while being compact in size. The water cooler comprises a ring of stationary guide blades provided to impart the desired direction of the flow of the air. Additionally, the design includes a series of metal plates disposed in planes at right angles to the motor shaft and the fan shaft, formed into passageways to allow the cooling air and hot liquid from the motor in heat exchange relationship.

U.S. Pat. No. 2,939,686 issued to J. Wildermuth on Jun. 7, 1960

This patent describes a heat exchange surface comprising respective plates with substantially hemispheric knobs, which serve the purpose of providing a flow disturbing surface across which the liquid to be cooled must flow, and spacing the plates apart. The knobs are arranged in a symmetrical pattern but are sufficiently off center so that when these alternate plates are inverted, the knobs of one plate bear against an unembossed portion of the next adjoining plate. Each plate is provided with a plurality of gasket grooves, there being lengthwise grooves along each side of the heat exchange area containing the knobs. The above described heat exchanger is primarily used for cooling milk, by the use of cold well water as it passes through the above described plates.

SUMMARY OF THE INVENTION

The present invention is directed to a small gas turbine generator set comprising three major modular sub-assemblies, a rotating group, a combustor, and a circumferential recuperator.

The rotating group comprises alternator-stator, compressor and turbine wheel. This modular group has an alternator rotor on a common shaft with a turbine wheel and compressor impeller supported, in one embodiment, by double acting compliant foil thrust bearings and a radial compliant foil bearing. The alternator portion of the shaft, supported by two radial compliant foil bearings, rotates within an alternator stator which is supported by cooling fins. The compressor of the rotating assembly does not have the conventional volute or scroll on the compressor discharge and the turbine does not have the conventional inlet housing on the turbine inlet found in prior turbines and compressors. Due to the intercompatibility and modularity of the components, the airflow path associated with the compressor discharge and the turbine inlet are formed upon installation of the rotating group into the recuperator on the one hand, and on the other, by final assembly of the combustor unit which forms the final closure for the turbine inlet air, as will become apparent.

The recuperator consists of a plurality of apertured boundary foils or plates arranged to provide the flow channels, manifolds, and the structure to permit the existence of differential pressure between the high pressure-cold side and high temperature-low pressure side of each foil or plate of the recuperator. The heat exchange surfaces of each of the foils are provided with embossments or dimples which serve the purpose of enhancing the heat transfer coefficients and structurally spacing the foils apart. The foils are configured in such a way that a single foil design can be used for the entire make-up of the recuperator core by stacking the apertured foils such that any two adjacent apertured foils in the stack are mirror images. In this manner, one side of the recuperator will be supported by the formed, opposed embossments. This support can be either in compression if it is the low pressure side or in tension after brazing if it is the high pressure side. Each of the foils may have integrally formed seal channels around the perimeter thereof and around the manifold passageway sections, or separate sealing rings may be used. After the foils are stacked to form the core, the unit is brazed to complete the seal between the high and low pressure flow sections and to form the fluid passageways or what would otherwise comprise the manifold in conventional recuperators.

The circumferential recuperator is unitarily constructed surrounding the rotating group and combustor of the gas turbine generator wherein the in-flowing air is heated by the recuperator assembly before entering the combustor of the engine. The circumferential recuperator provides a plurality of bifurcated circumferential path fluid passageways. One fluid comprises high pressure air from the gas turbine compressor, which flows through one side of the recuperator, and the low pressure turbine exhaust gas comprises the other fluid which flows through the other fluid passageway. The manifolds or fluid passageways for the two fluid flows are integrally formed within the foils. This recuperator arrangement allows for fluid flow entry from either end of the recuperator or from any location along the length thereof. The circumferential recuperator is designed for high heat transfer effectiveness. Heat is transferred from the high temperature exhaust gas to the colder compressor air through the use of bifurcated circumferential flow. The circumferential recuperator thereby provides engine performance benefits primarily as a reduction in fuel consumption. These improvements in overall engine performance are provided by the circumferential recuperator heat transfer effectiveness, while weight and pressure drop across the recuperator are minimized. Further, the overall design acts to absorb sound as well as to safely insulate the surrounding environment, should the rotating assembly fail and be centrifugally driven outside of its primary containment.

The advantage of the power plant of this invention, is that it allows for integration of the flow path for the combustor and rotating assembly, within the center of the circumferential recuperator.

Accordingly it is an object of the invention to provide a gas turbine generator set.

It is another object of the invention to provide a gas-fueled turbine generator set for use in powering vehicles.

It is another object of the invention to provide a gas turbine generator set having a modular design, using compliant foil bearings, single stage components and a circumferential recuperator.

A further object of the invention is to provide a gas turbine generator set requiring less scheduled maintenance in its lifetime than generator sets currently in production.

Yet another object of the invention is to provide a gas turbine generator set which can be manufactured for a cost below the current generator sets commercially available.

Another object of the invention is to provide a small gas turbine generator set which simultaneously supports, by compliant foil bearings, an alternator rotor, compressor impeller, and turbine wheel on a common shaft.

A further object of the invention is to provide a gas turbine generator set which allows for integration of the flow-path for the combustor and rotating assembly upon installation within a circumferential recuperator.

Another object of the invention is to provide a gas turbine generator set, wherein its combustion makes use of a flow path integration, allowing for either a lean pre-mixed conventional combustor, or a catalytic combustor, which greatly reduces the emission levels to well below the current allowable levels for small gas turbines.

A further object of the invention is to provide cooling of the alternator stator and rotor by using the incoming compressor airflow, flowing over a plurality of stator cooling fins surrounding the alternator stator and an air flow path between the stator and rotor. Cooling of the stator end turns is accomplished by some of the gas flow passing through the bearing carriers.

Generally, it is an objective of the present invention to provide a small gas turbine generator set, which has no gear box, no lubrication system, no liquid coolants and no engine-driven accessories, and is affordable, compact, lightweight, and additionally has low emissions that can be used as a stand alone generator set or to extend the range of electric vehicles to equal or exceed those of conventional cars, trucks, and buses.

BRIEF DESCRIPTION OF THE DRAWINGS

FIG. 1A is a cross-sectional view of the gas turbine generator set of FIG. 1;

FIG. 2A.1 is an exploded view of a general section of the circumferential recuperator assembly shown in FIG. 2;

FIG. 2A.2 is an exploded view of the compressor discharge section of the circumferential recuperator assembly shown in FIG. 2;

FIG. 2I depicts another embodiment of the thin boundary foil used to assemble the recuperator shown in FIG. 2;

FIG. 3D is a sectional view of the compressor inlet housing shown along the line 40—40 of FIG. 3C depicting the compressor diffuser;

FIG. 6A is an end view of the turbine nozzle passageways taken along the view line 60—60 of FIG. 6;

DESCRIPTION OF THE PREFERRED EMBODIMENTS

Power System Components

Figure 1:
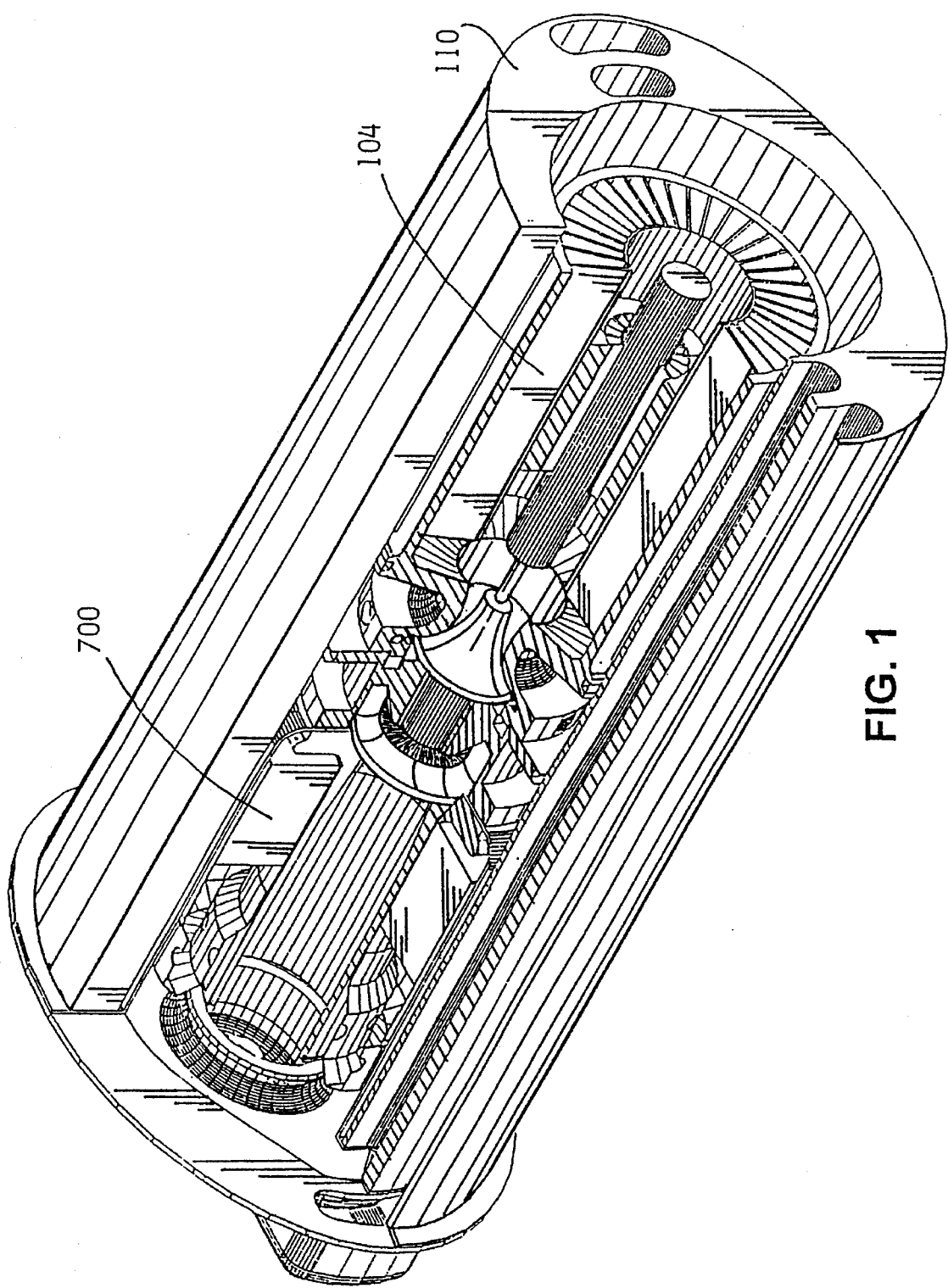
FIG. 1 is a perspective view, partly cut-away to show the modular components of the gas turbine generator set of the present invention.

In simplest terms this invention encompasses essentially three modules, and is intended to be easily repaired by simple replacement of affected modules. Shown in FIG. 1, the first modular unit comprises the recuperator 110; the second the rotating assembly 104, and the third, the combustor unit 700.

Failure of any one component is easily remedied, as will be seen, by simple replacement of the defective module.

The overall system in general terms will now be described.

FIG. 1A schematically depicts a cross-sectional view of the gas turbine generator set 100 of the present invention.

After start-up, ambient air is drawn in by the compressor impeller 312, as represented by arrow 102, through an alternator-stator 202. Compressed air produced by the compressor impeller 312 is then delivered to the manifold section of the circumferential recuperator assembly 110, wherein it is heated by the engine exhaust gases. The heated compressed air from the circumferential recuperator 110 is then delivered to a combustor 700. Within combustor 700, the heated, compressed air is mixed with fuel from a fuel tank (not shown) and combusted, producing hot gas. The hot high pressure gas is discharged through the turbine wheel 400 producing rotational output power. This output power rotationally drives the compressor impeller 312 and alternator rotor 222 which is rotated within alternator-stator 202, whereby electrical energy is generated. Exhaust gas exiting the turbine wheel 400 enters the manifold section of the circumferential recuperator 110 and is diverted to a plurality of circumferential exhaust gas passageways 116, described in more detail below, and then exhausted to the ambient atmosphere.

Recuperator

In the preferred embodiment, the recuperator 110 of the present invention is an all prime surface, counter-flow, heat exchanger which transfers a large portion of the available heat from the exhaust gases to the combustor inlet air. This reduces the fuel consumed in the combustor, and increases the efficiency of the turbine generator set 100. By using a recuperator it is possible to achieve engine efficiencies equal to or higher than an internal combustion engine.

Figure 2:
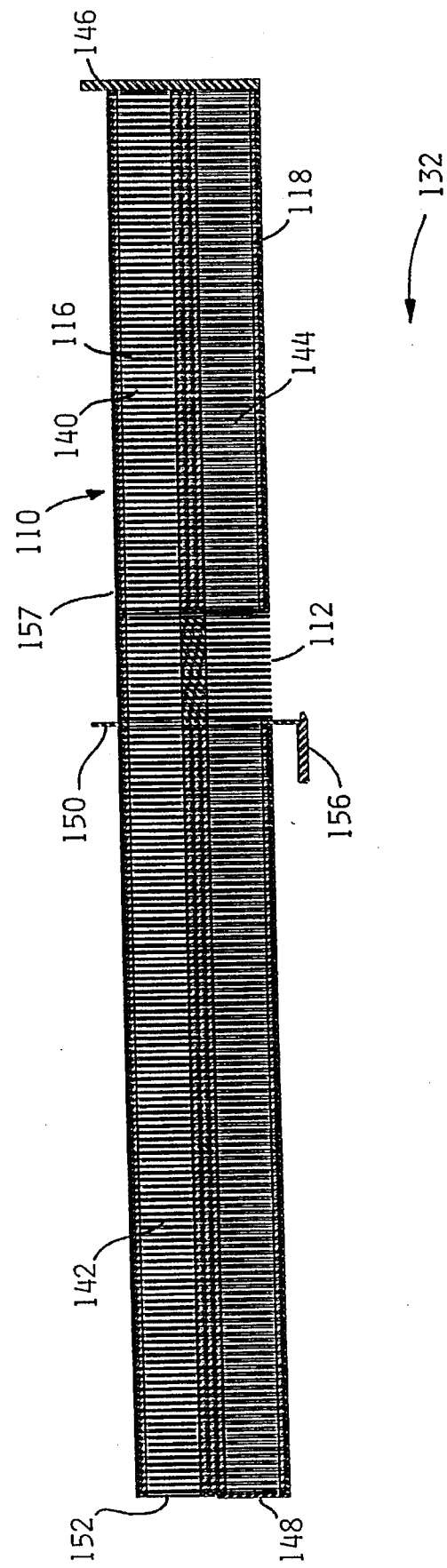
FIG. 2 is a cross-sectional view of the recuperator of the present invention.

As shown in FIG. 2, the recuperator 110 comprises a circumferential core 118, in which heat is transferred through narrow, side-by-side, circumferential passageways 116 and 140. Pressured fluid passageways 116 and 140 separate the exhaust gases which are near atmospheric pressure from the combustor inlet air, which in the preferred embodiment is at about three atmospheres. Hot exhaust gas enters recuperator 110 and splits its flow so that it can circulate both clockwise and counter-clockwise half way around the inside circumference of the plurality of low pressure, circumferential passageways 116 before it recombines and exits. The combustor inlet air does the same on the outside surface of the passageways 116 through the plurality of high pressure, circumferential passageways 140 in the opposite direction so that the heat exchanger is in true counter-flow.

FIG. 2A.1 shows a partially exploded schematic view of the major components of the circumferential recuperator 110. The circumferential recuperator 110, in one embodiment, is constructed entirely from five individual components which are stacked to make up the whole. These components include generally thin apertured boundary plates or foils 122 shown in FIGS. 2B and 2C, and compression-sealing outer and inner rings 124 and 125 respectively, shown in FIG. 2D, and exhaust-sealing outer and inner rings, 126 and 127 respectively, shown in FIG. 2E. The apertured foils 122, in combination with inner sealing rings 125 and 127, define a center aperture 132. When stacked, these elements form a central space or chamber 132 as shown in FIG. 2 to receive the rotating group 200, and combustor 700.

Figure 2B:
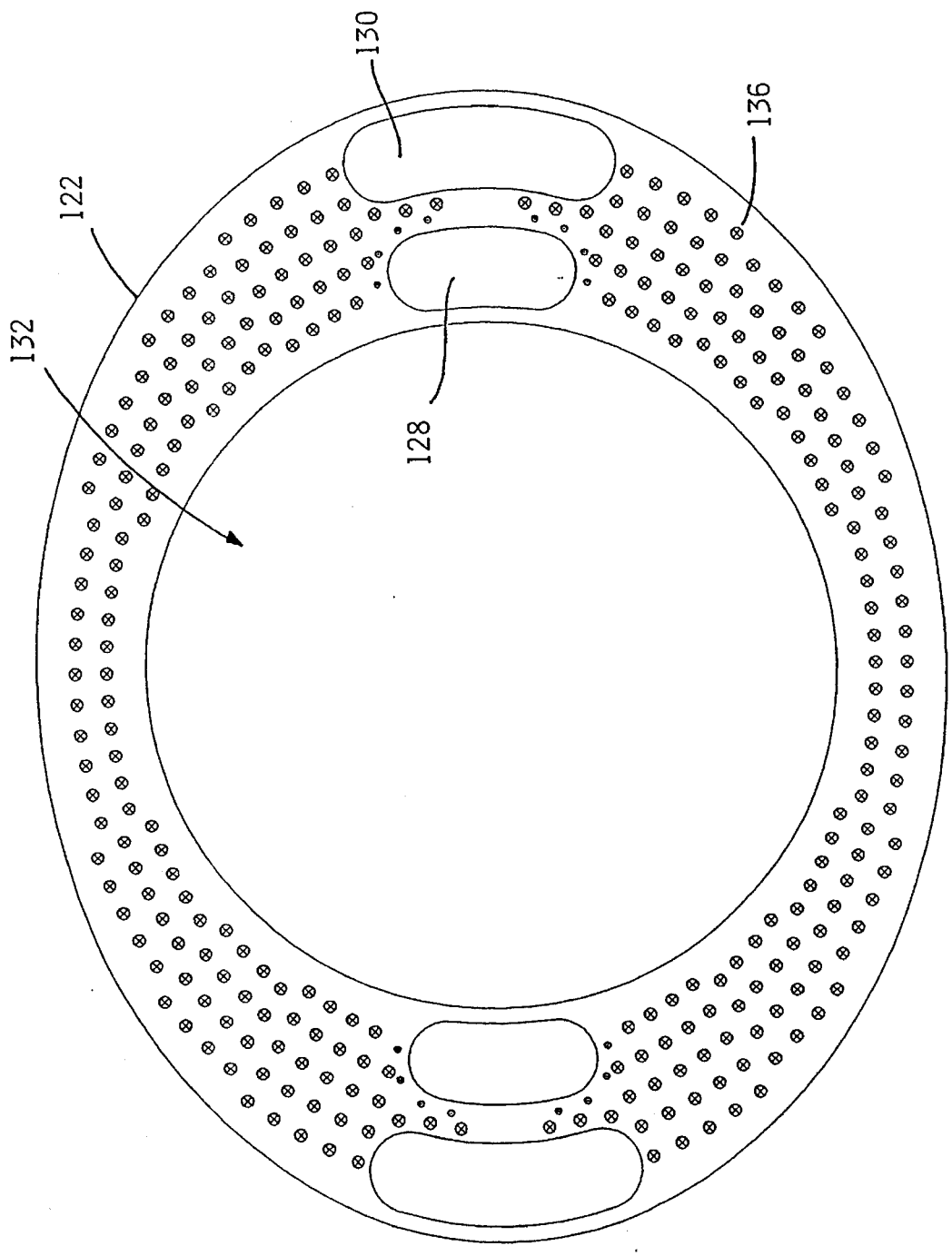
FIG. 2B depicts the thin boundary foils of the recuperator assembly shown in FIG. 2A.1. Circles with an x represent embossments formed upwards out of the paper and circles with an o represent dimples formed downwards into the paper.
Figure 2C:
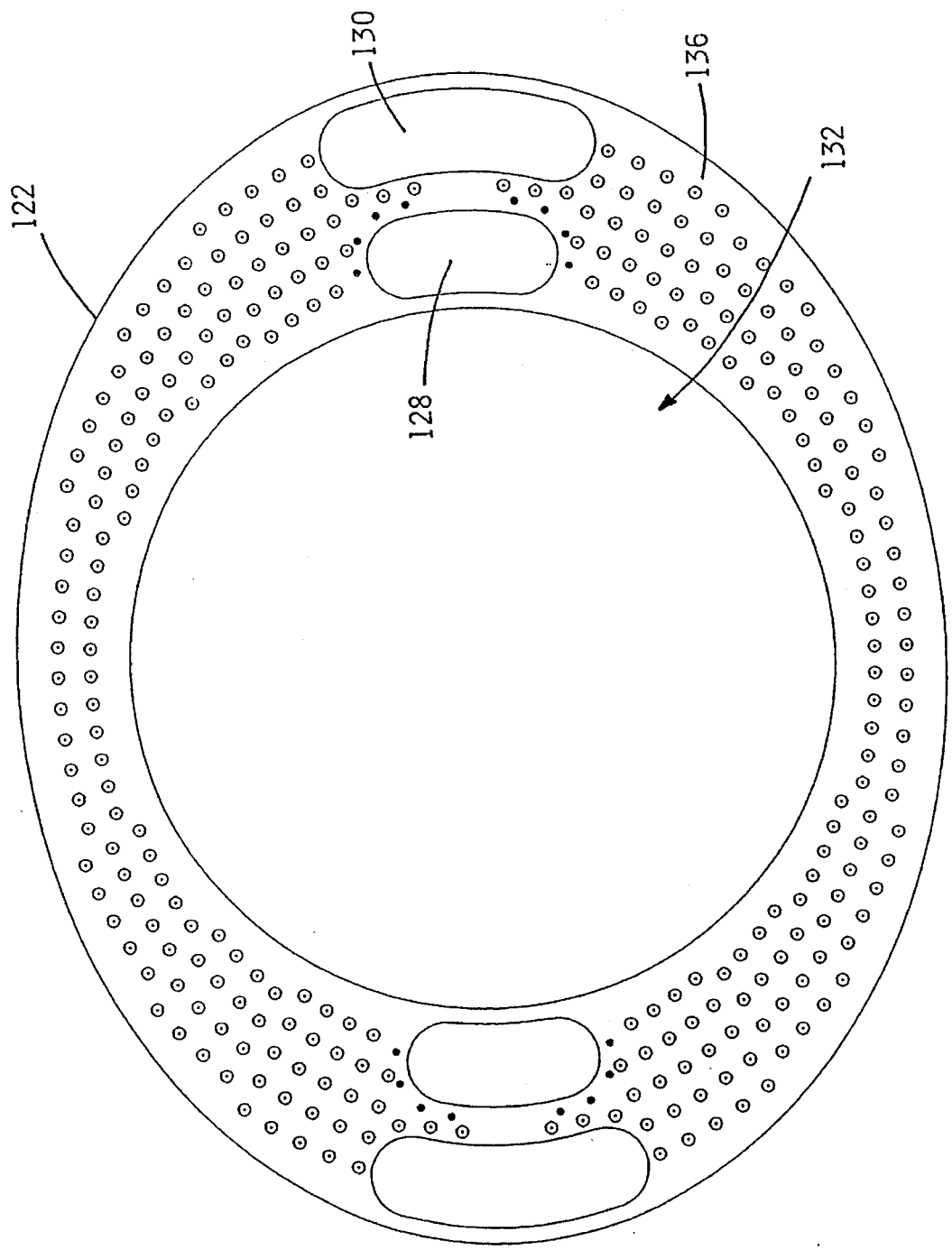
FIG. 2C is the opposite side of the thin boundary foils shown in FIG. 2B.
Figure 2D:
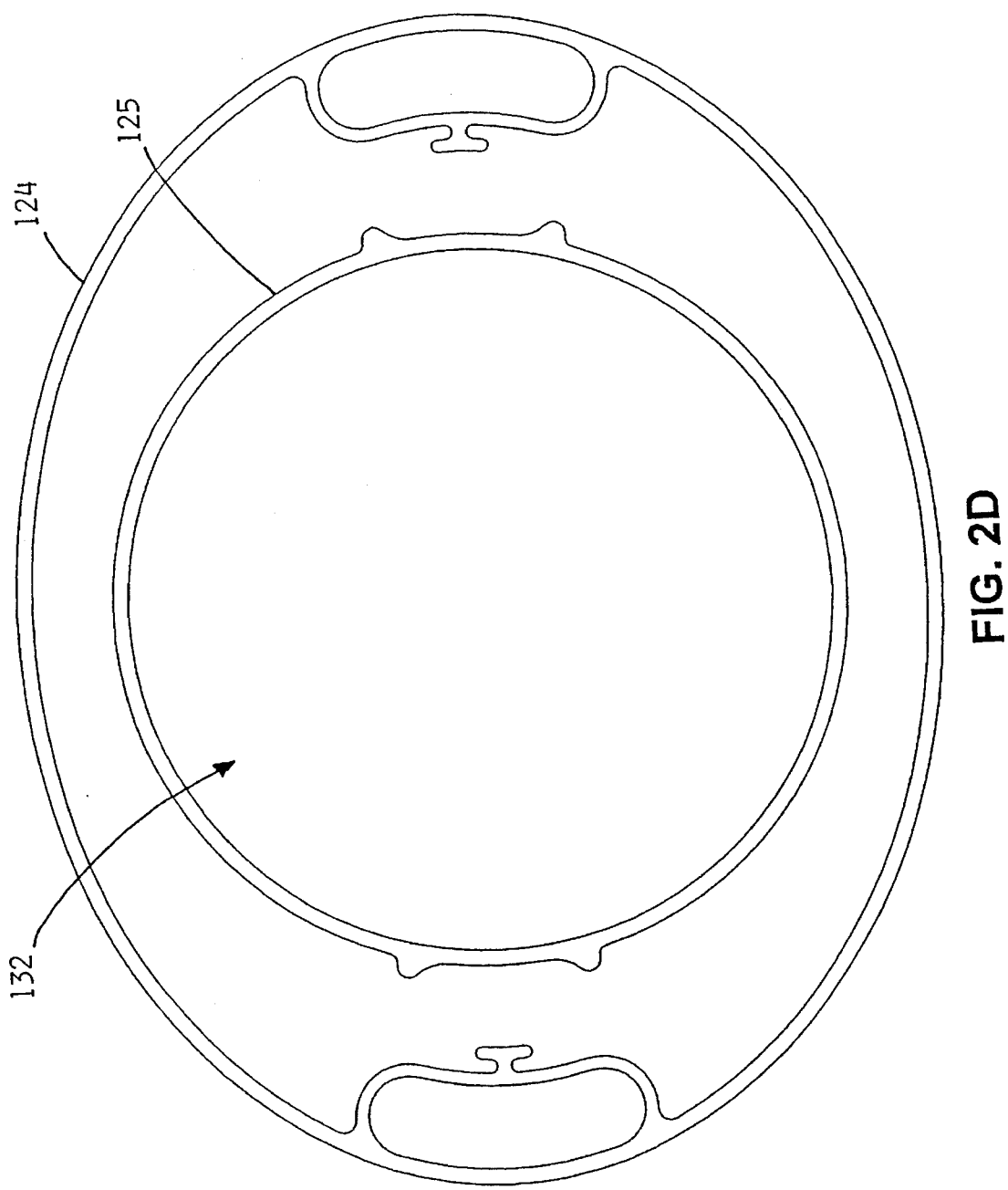
FIG. 2D depicts the high pressure-sealing outer and inner rings of the circumferential recuperator assembly shown in FIGS. 2A.1, and 2A.2.
Figure 2E:
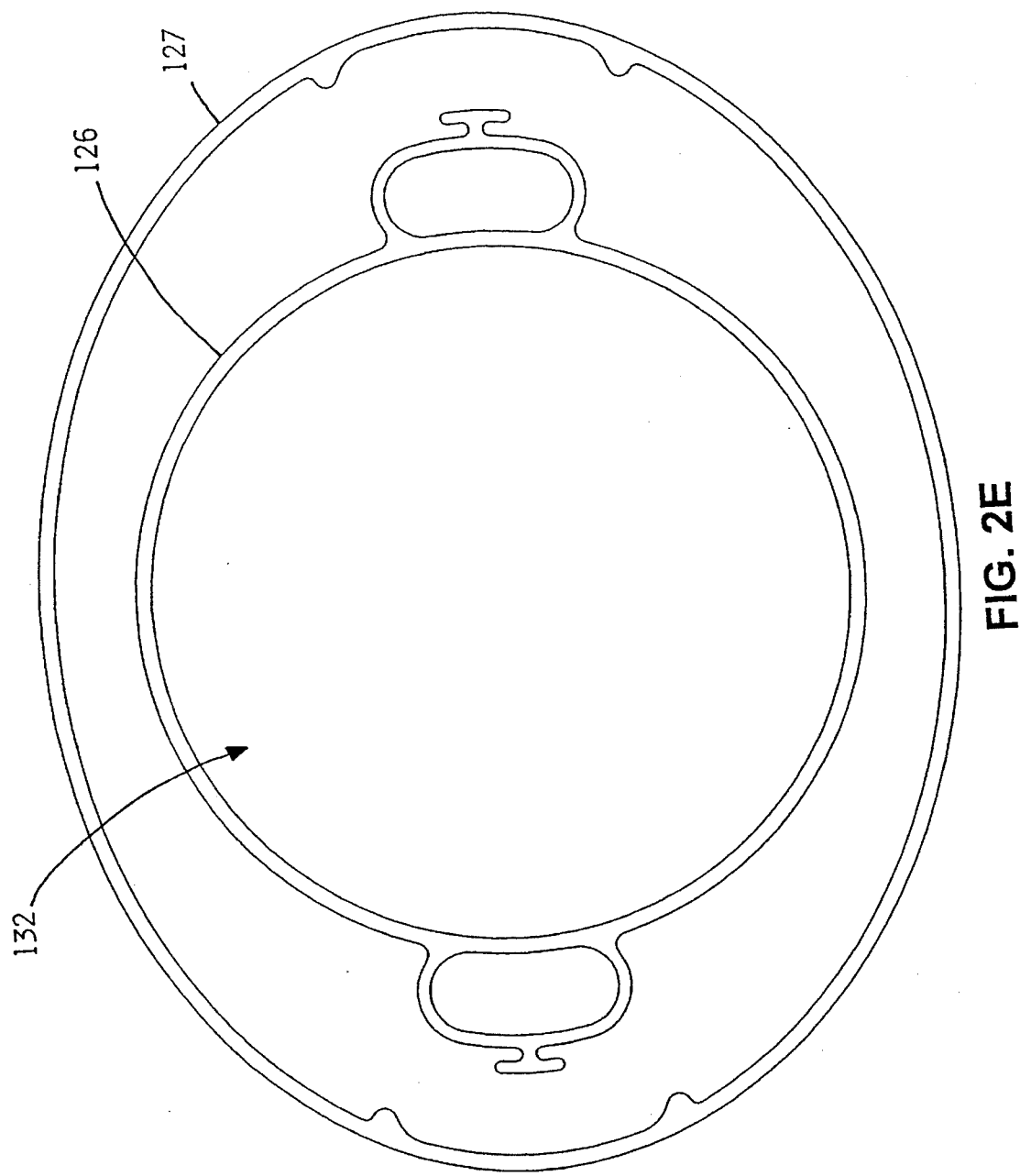
FIG. 2E depicts the low pressure-sealing outer and inner rings of the circumferential recuperator assembly shown in FIG. 2A.1.

Referring to FIGS. 2B and 2C, the foil 122 is formed to define at each end, generally ellipsoidal shaped high pressure manifold ports 128, located adjacent to central aperture 132, and generally ellipsoidal shaped low pressure manifold ports 130, adjacent to and in line with inlet apertures 128. As shown in FIG. 2B, formed on one side of the boundary foil 122 are spaced embossments or dimples 136 which serve the purpose of structurally spacing apart each of the adjacent boundary foils 122, and enhances the heat transfer effectiveness of the assembly 110. Each of the foils 122 is arranged in such a way that alternate foils are turned over in relation to the adjacent foil. Thus, the recuperator core 118 and chamber 132 are formed.

As shown in FIG. 2A.1, the low pressure passageways 116 of the recuperator 110 are formed by positioning alternate foils such that the embossed sides of the foils 122 contact each other and by placing the inner and outer rings 126 and 127 between the foils. The high pressure passageways 140 are formed by placing inner and outer rings 125 and 124 between alternate sets of low pressure passageways. This process is continued with each of the foils 122 alternately stacked forming the annular core 118 defining a high pressure flow section 140 supported on the formed hemispheric dimples 136 with the opposite side being a low pressure flow section 116.

After the foils 122 and rings 124, 125, 126, and 127 are stacked to form the annular core 118, the unit is brazed, thereby completing the seal between the high and low pressure flow sections. The inlet and outlet apertures 128 and 130 form a high pressure axial fluid passageway 144 and a low pressure axial fluid passageway 142. For mounting purposes, a recuperator end face plate 146 may be provided at one or both ends of the recuperator 110.

Figure 2F:
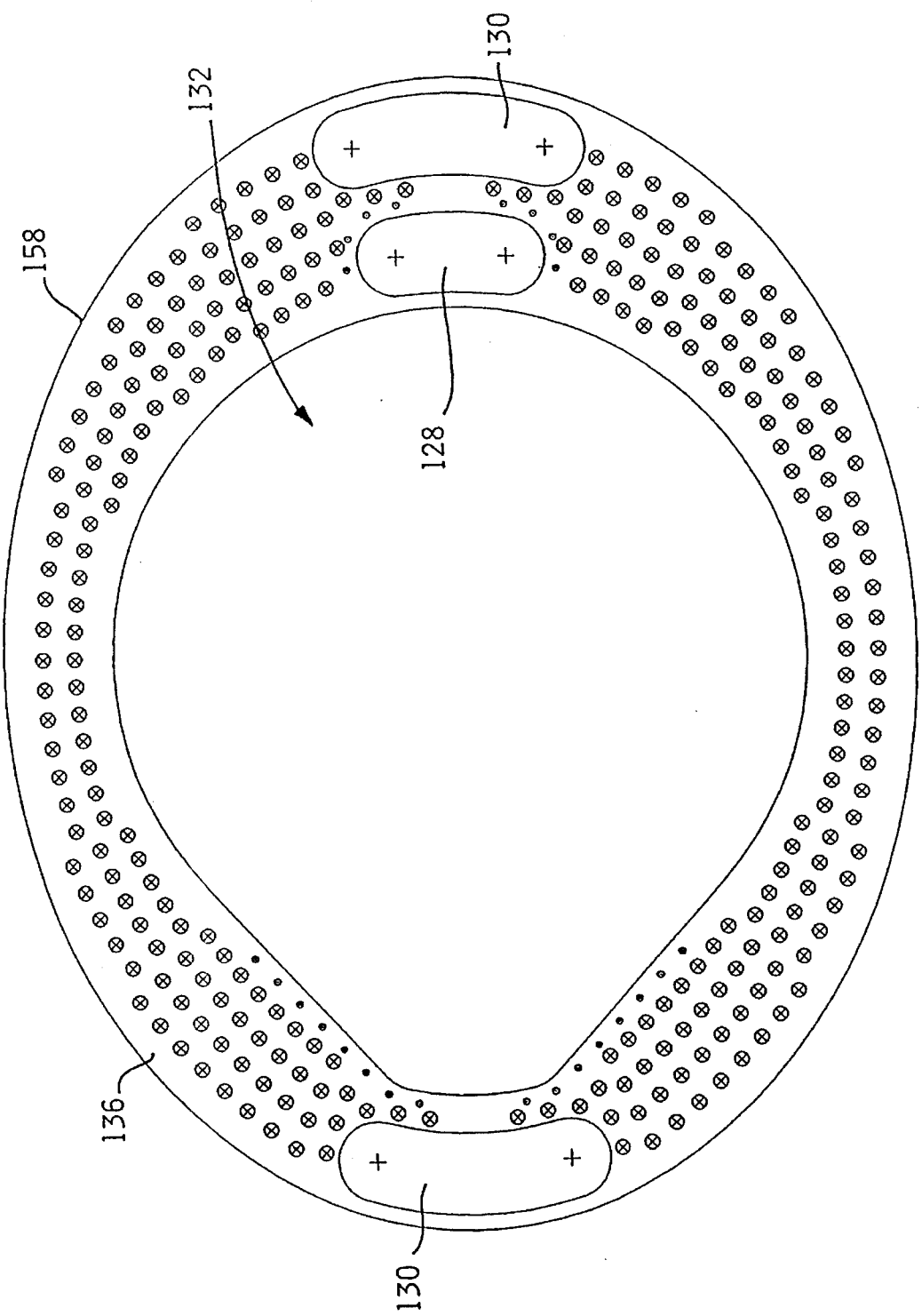
FIG. 2F depicts how the basic thin boundary foil is modified locally to channel the compressor discharge flow into the high pressure side of the circumferential recuperator assembly shown in FIG. 2.
Figure 2G:
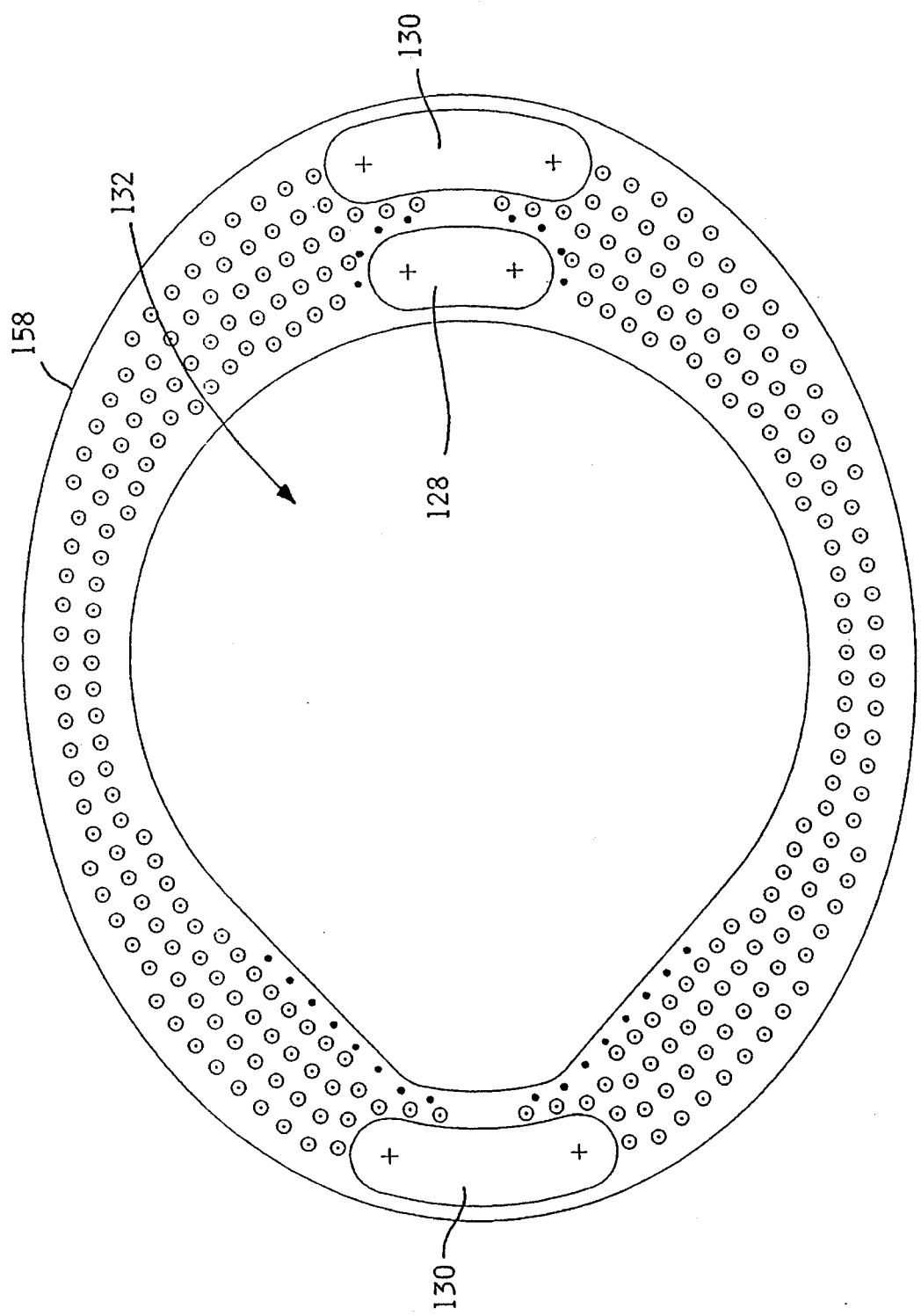
FIG. 2G is an opposite side of the thin boundary foil shown in FIG. 2F.
Figure 2H:
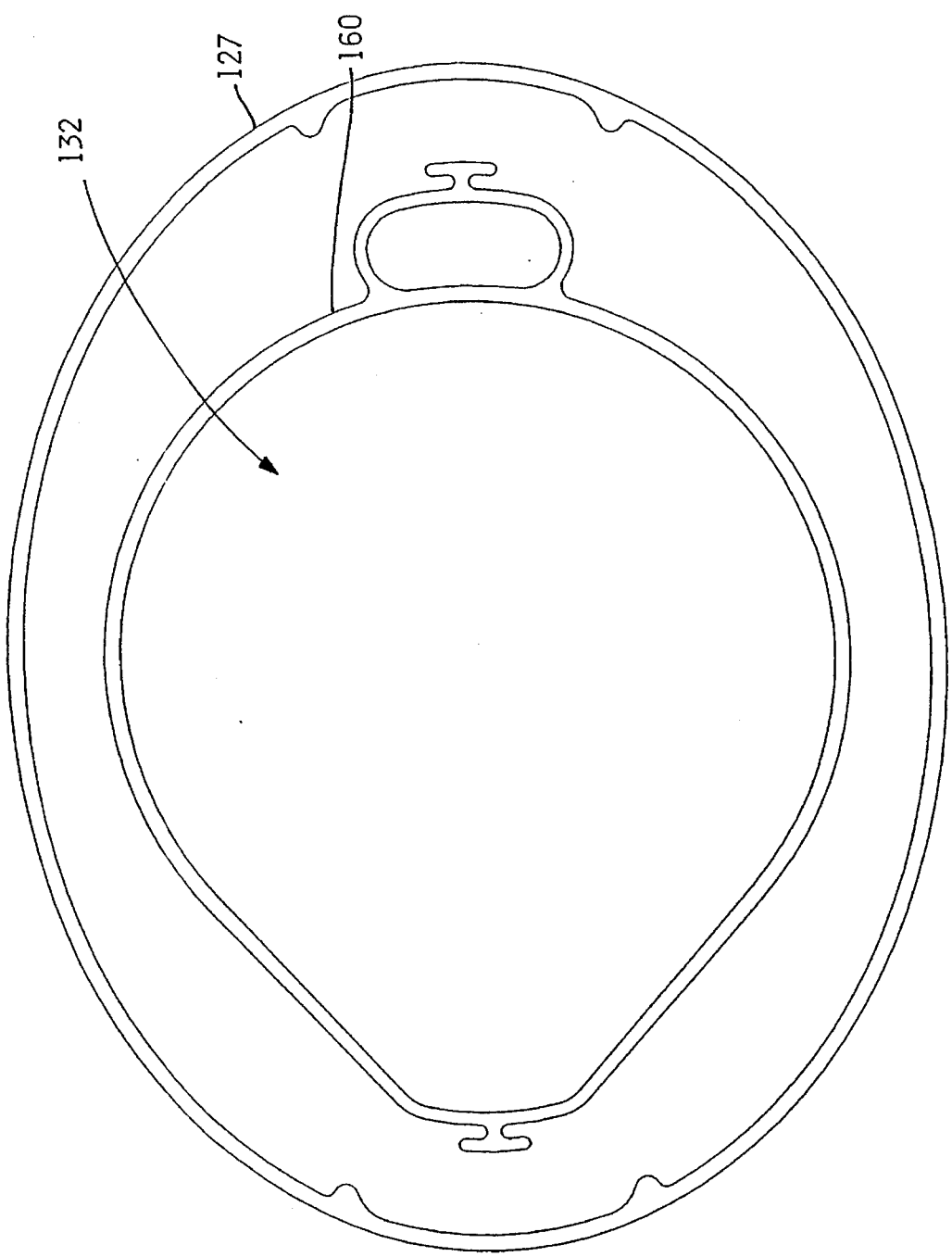
FIG. 2H depicts the low pressure seal ring set, which defines the compressor discharge air entry to the circumferential recuperator assembly shown in FIG. 2.

As shown in FIG. 2, a fluid entry duct 112 of the recuperator 110 is formed by replacing the foils 122 with a fluid duct foil 158, having the central aperture 132 enlarged such that it encompasses one inlet aperture 128, as shown in FIGS. 2F and 2G. When forming the center section of annular core 118, a plurality of fluid duct foils 158 will be substituted for the foils 122, and a fluid duct inner ring 160, shown in FIG. 2H, will replace the exhaust-sealing inner ring 126, thereby forming the annular compressed fluid duct 112 within the center portion of recuperator 110.

Shown in FIG. 2, opposite the recuperator 110 end face plate 146 is an exhaust ambient interface plate 148 having an exhaust outlet aperture 152 for releasing hot exhaust gases to the atmosphere. A compressor bulk head plate 150 is positioned between two seal ring sets. On the compressor discharge side of the bulk head plate 150, seal rings 127, 160, 124 and 125, and boundary foils 158 are assembled to form the compressed fluid duct 112. Transition plate 157 is positioned between seal ring sets 160-127 and 126-127 allowing the general assembly of seal rings and boundary foils of recuperator 110. The compressor bulk head plate 150 defines the same center aperture 132 to receive the rotating group 200 and further has brazed to it a compressor bulk head ring 156 for supporting the rotating group 200, to be described in more detail below.

Figure 2J:
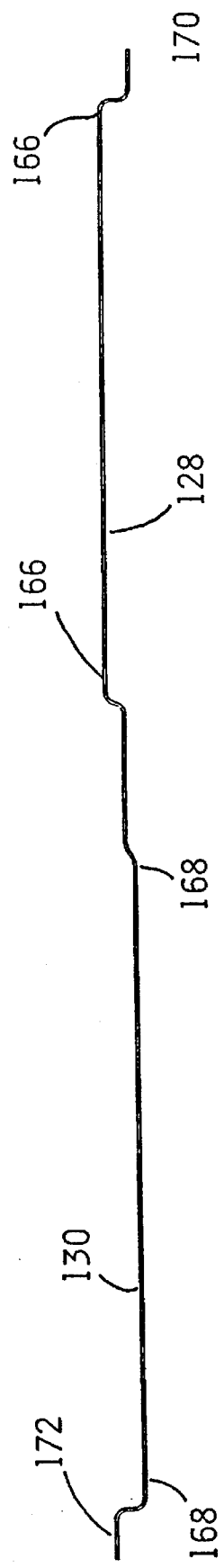
FIG. 2J is a section of the thin boundary foil shown along the line 20—20 of FIG. 2I.
Figure 2K:
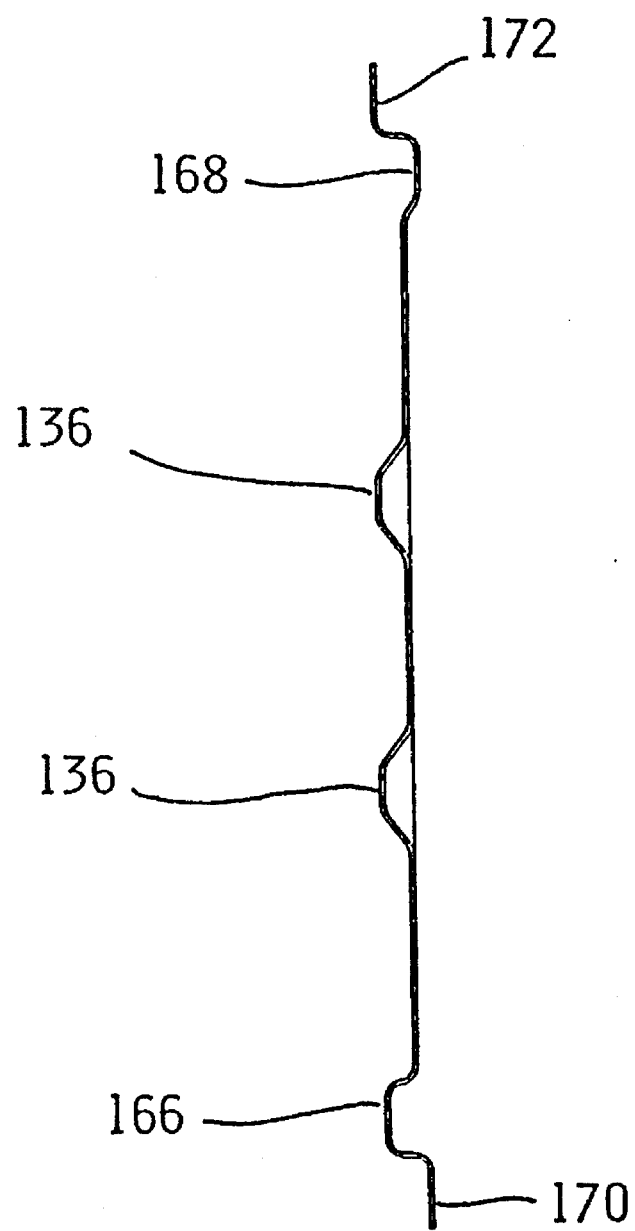
FIG. 2K is a section of the thin boundary foil shown along the line 30—30 of FIG. 2I.

In another embodiment, shown in FIGS. 2I, 2J, and 2K, the inlet and outlet apertures 128 and 130 may be formed to include inlet and outlet border ridges, 166 and 168 respectively, thereabout. Additionally, the inner and outer edges of the foils 122 may be stamped to also include inner and outer border ridges 170 and 172. These ridges will replace the compression and exhaust-sealing rings 124, 125, 126, and 127, described above. The foils 122 are brazed together as in the preferred embodiment to form the recuperator 110, wherein the ridges act as the sealing means to form the axial and circumferential exhaust and inlet gas passageways 116 and 140.

Rotating Assembly

Figure 3:
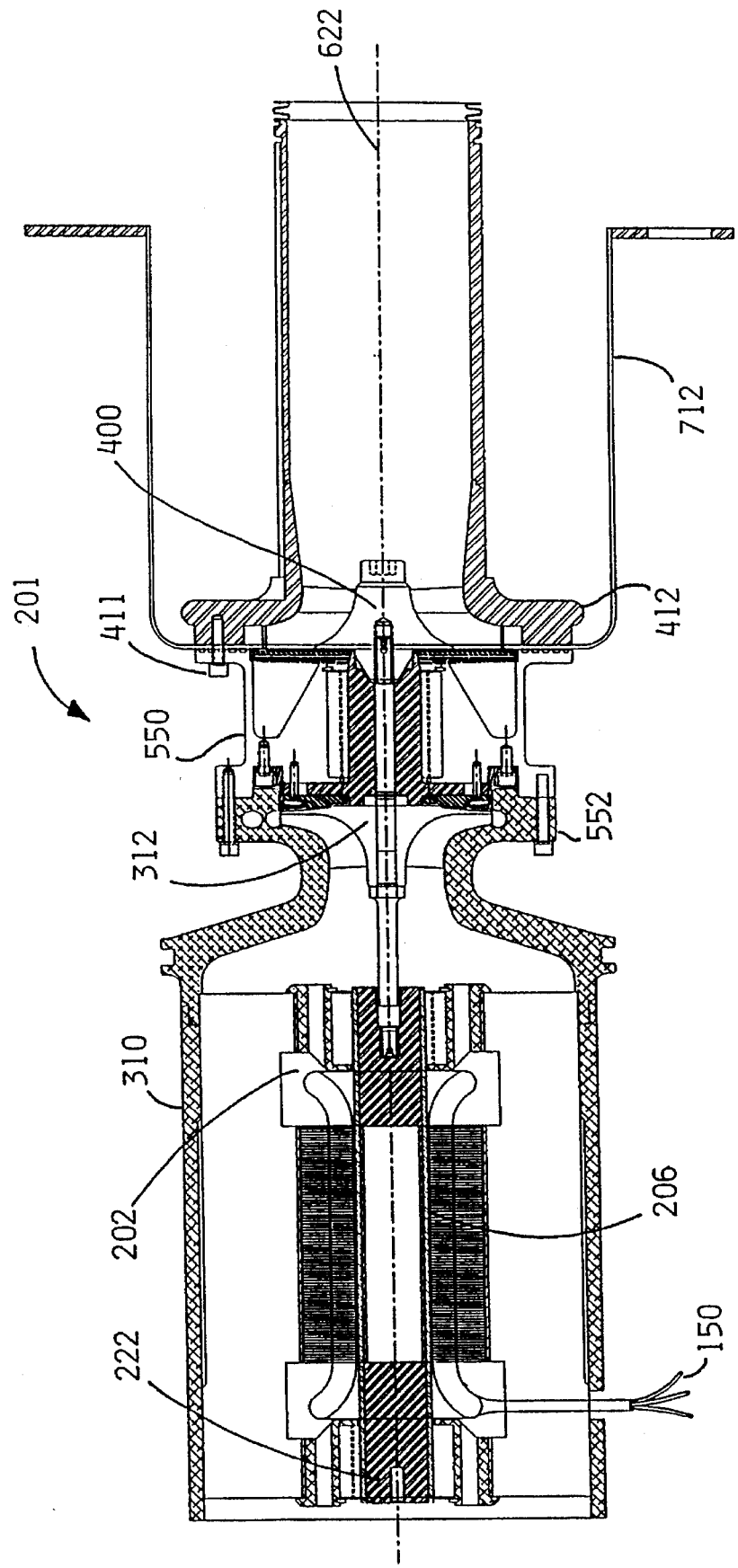
FIG. 3 is a cross-sectional view of the rotating assembly of the present invention.

FIG. 3 shows the rotating assembly 201 comprising the rotating group 200 prior to insertion into chamber 132 of circumferential recuperator 110. Compressor housing 310 is bolted by a plurality of spaced, compressor bolts 552 to thrust and radial air bearing housing 550. The associated bearing housing 550 and compressor housing 310 is then bolted to a turbine housing 412, by means of spaced bolts 411. The aforementioned housings 310, 550 and 412 are joined in line with respect to each other so that alternator rotor 222; compressor impeller 312 and turbine wheel 400 rotate about a common central axis 622. Additionally, between bearing housing 550 and turbine housing 412, there is bolted therebetween a combustor cowling 712.

The rotating group 200 of the instant invention does not require the use of a free turbine for vehicular applications as described in the prior art since it is not required to stop the output shaft when the vehicle stops. This eliminates one turbine wheel, one set of bearings and a need for a gear box. Operating the generator at the same speed as the turbine and compressor, allows all rotating components to be mounted on one shaft and eliminates the need for the primary reduction gear box used in conventional designs. With the power producing and the power absorbing elements of the rotor group mounted on a common shaft, there is no lateral loading and air bearings may be used. With compliant foil bearings on the rotor shaft and no gear box, there is no need for a lubrication system. Therefore no oil or other lubricants are used anywhere within the gas turbine generator set 100 of the instant invention.

Figure 3A:
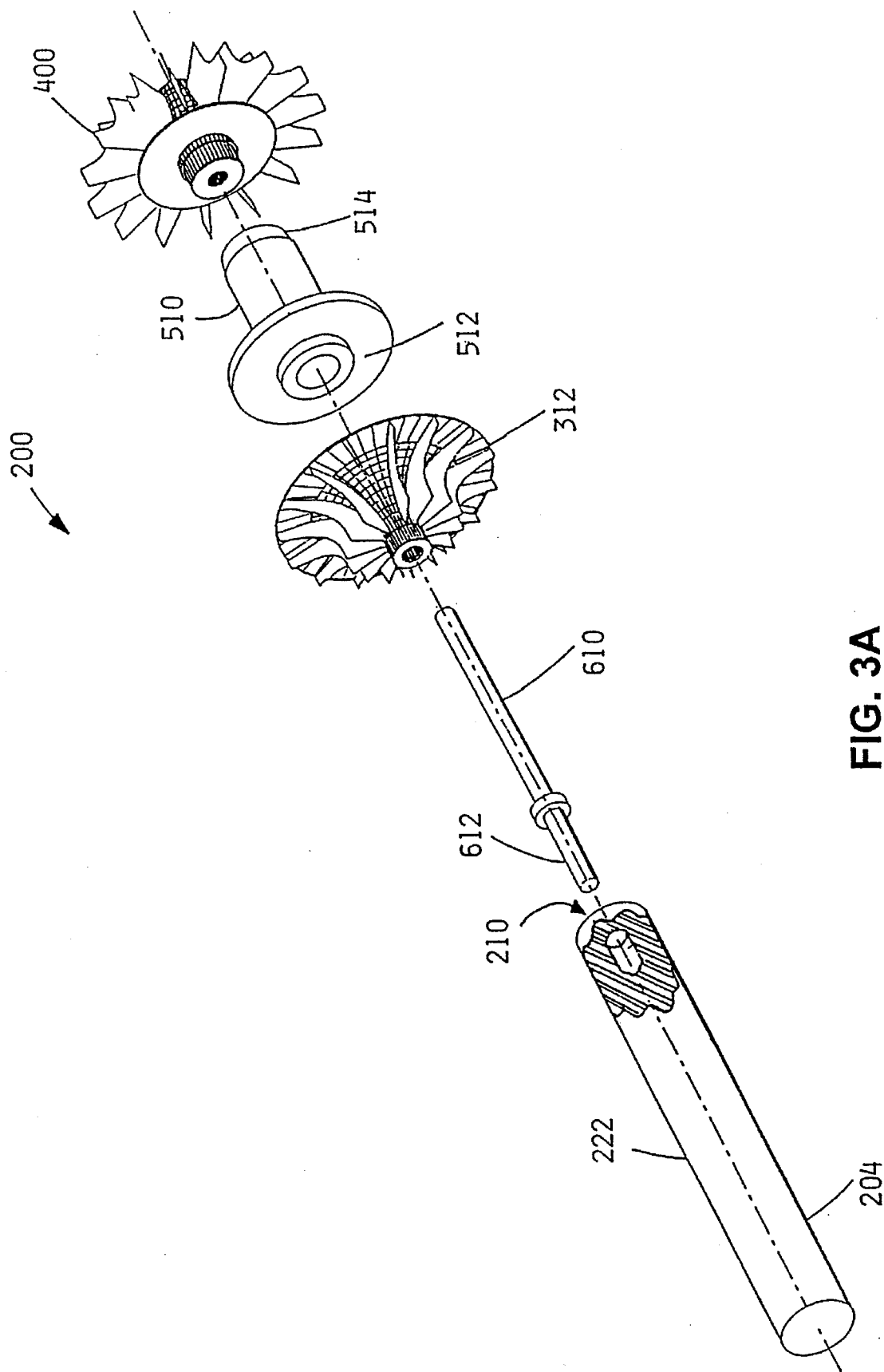
FIG. 3A is an exploded view of the major rotating elements of the rotating group of the present invention.

FIG. 3A shows an exploded view of the rotating elements of the rotating assembly 201, more specifically, compressor impeller 312 is placed against the front surface 512 of thrust and radial compliant foil flanged rotor 510, and turbine wheel 400 is placed against the opposite surface 514 of thrust and radial compliant foil bearing shaft 510, wherein both compressor impeller 312 and turbine wheel 400 are lockingly engaged to the thrust and radial shaft 510 by tie-bar 610, locking both compressor impeller 312 and turbine wheel 400 together in compression. Further, tie-bar 610 engages recess 210, in friction fit engagement of retaining shaft 204, whereby alternator rotor 222, compressor impeller 312, air bearing shaft 510, and turbine wheel 400, rotate together.

A portion of the tie-bar 610 is used as a quill shaft 612 between the alternator rotor 222 and compressor impeller 312. The quill shaft 612 is used for alignment means during high speed rotation of the rotating group 200, as will be more fully described below.

The overall components of the rotating assembly 201 will now be described in further detail.

Compressor

Figure 3B:
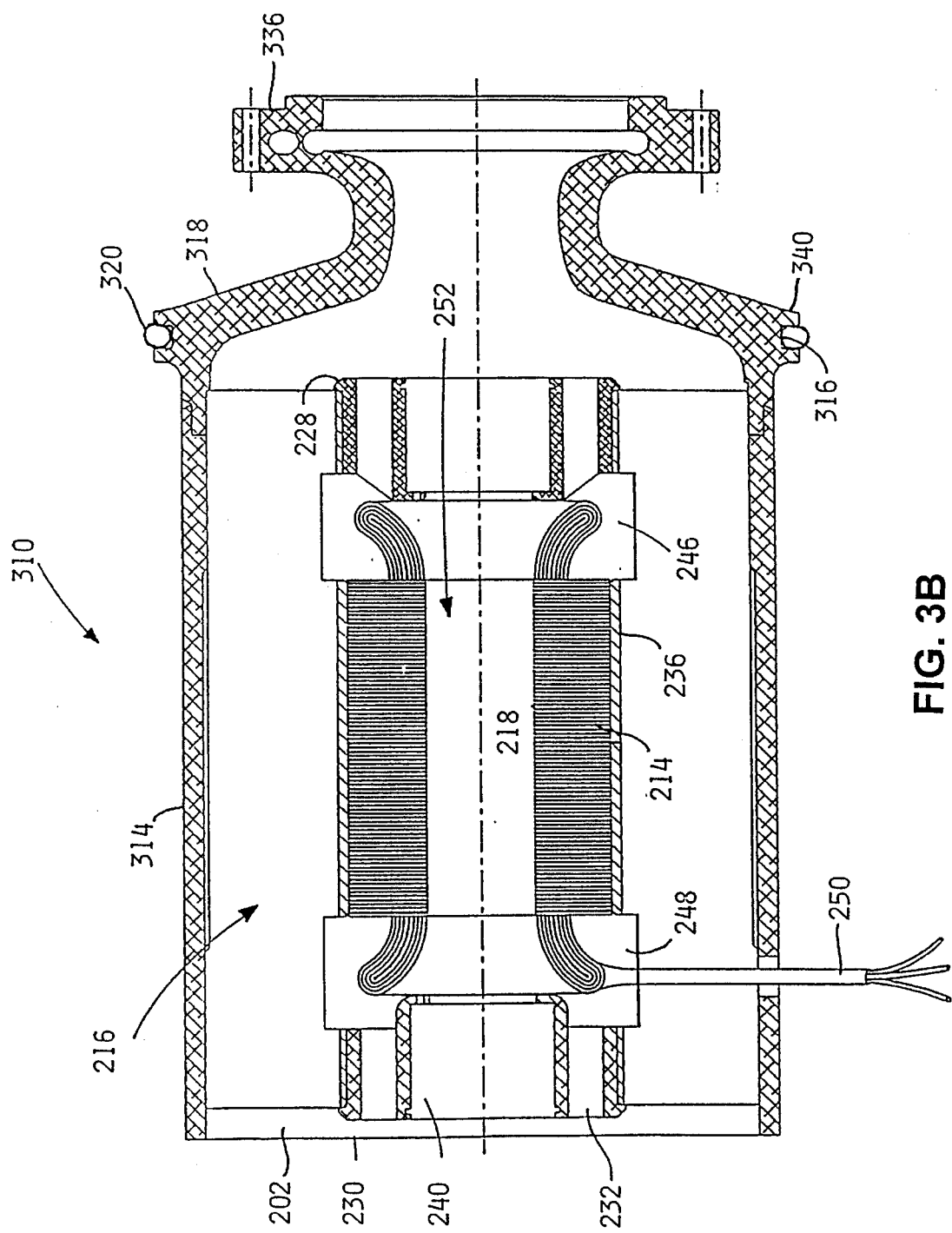
FIG. 3B is a cross-sectional view of the compressor inlet housing, alternator-stator and compliant foil bearing carrier of the present invention.
Figure 3C:
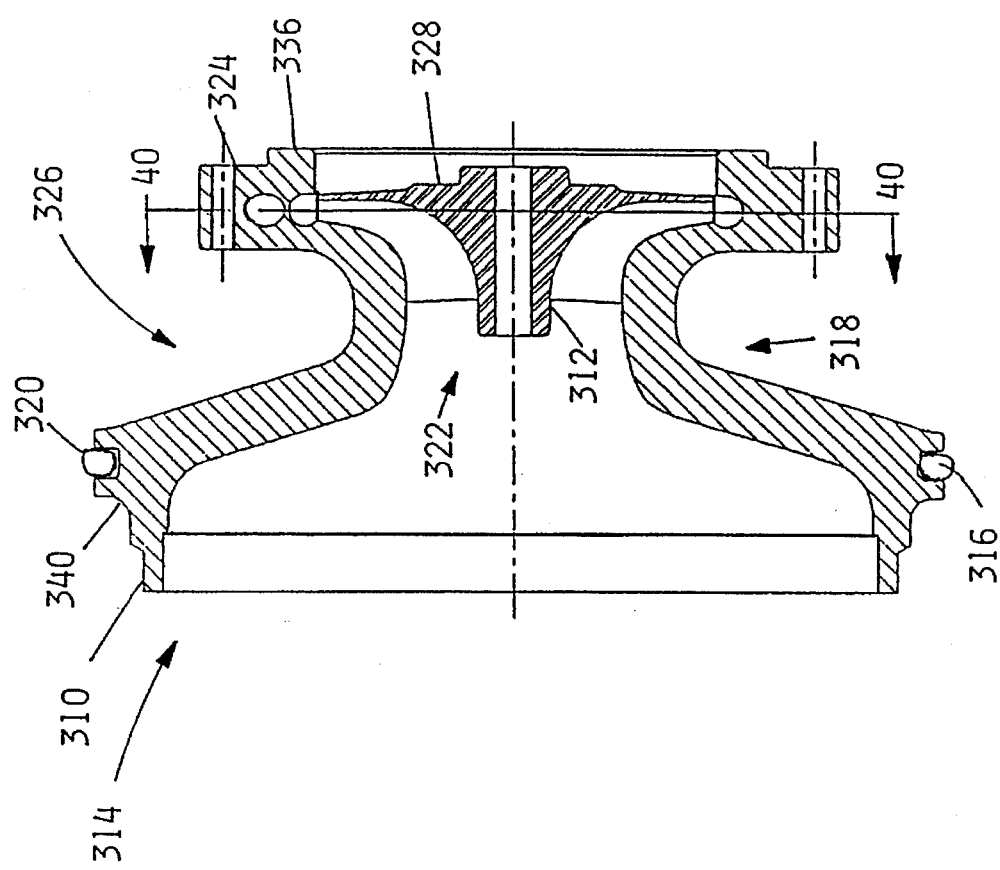
FIG. 3C is a partial, enlarged cross-sectional view of the compressor inlet housing shown in FIG. 3B.

As seen in FIG. 3B, compressor housing 310 comprises three sections, an annular alternator section 314, a tapering section 318 and a diffuser section 336. The annular alternator section 314 defines an annular cavity having an inner diameter sized to engage and receive the alternator-stator 202. The compressor housing 310 further defines a recuperator support ring 340, located between the annular alternator section 314 and tapering section 318. The recuperator support ring 340 has an annular O-ring groove 316 sized to retain an O-ring 320, as shown in FIGS. 3B and 3C.

When the compressor housing 310 is positioned within chamber 132 of recuperator 110, O-ring 320 seats against the outer surface of the compressor bulk head ring 156 as shown in 2. Once O-ring 320 is properly positioned within chamber 132 of recuperator 110, tapering section 318 forms a compression plenum chamber 326 between tapering section 318 and fluid duct 112 of recuperator 110. The inner portion of tapering section 318 defines an annular core 322 sized to receive and allow rotation of the compressor impeller 312.

As best seen in FIG. 3D, diffuser section 336 defines a plurality of radially spaced compressor outlet passageways 324. Compressor outlet passageways 324 form a spiral about an annular chamber 328 within diffuser section 336, as shown in FIGS. 3C and 3D. Each of the outlet passageways 324 begins with a small radius 328 and flares out to a larger radius 330, into the compressor plenum chamber 326 formed between tapered section 318 and recuperator 110.

Alternator

As seen in FIG. 3, the alternator-stator 202 of the present invention is mounted in the compressor housing 310 opposite the combustor 700 and turbine wheel 400 as shown in FIG. 1A. This keeps the generator magnets 206 well away from the heated turbine, and eliminates the need for cooling. Liquid cooling compromises reliability and introduces maintenance problems. Cooling with high pressure bleed air also would reduce the available power and efficiency of the engine motor 100.

Figure 4:
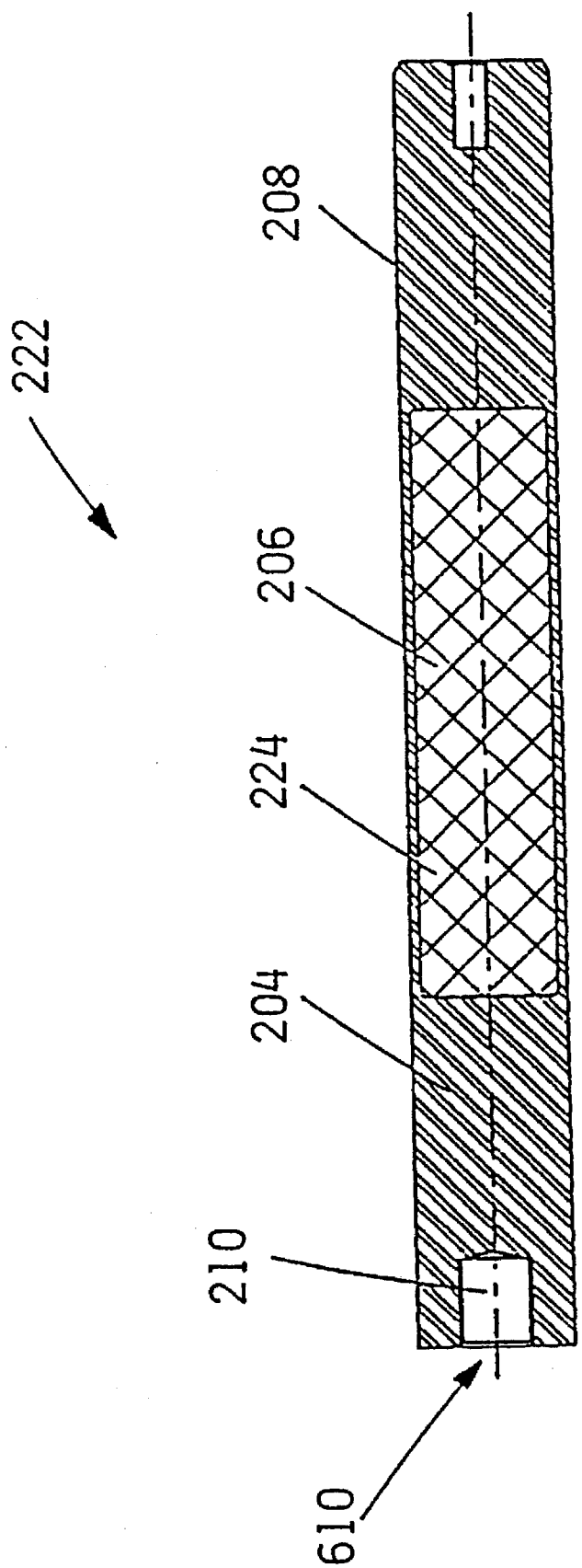
FIG. 4 is a cross-sectional view of the alternator rotor of the present invention.

Shown in FIG. 4 is the alternator rotor 222 wherein, as seen in FIG. 1A, is positioned within the center of the alternator-stator 202. A retaining shaft 204, which in the preferred embodiment may be formed from a cylindrical steel bar, has an aperture 224 at its center, sized to receive a cylindrical magnet 206. Magnet 206 is held in place by a cylindrical sleeve 208 which is either press-fitted onto retaining shaft 204 or is heat shrunk thereon using heat shrinking processes known in the art. A bore 210 is provided at one end of retaining shaft 204 to receive the tie-bar shaft 610, to be described in more detail later.

Figure 4A:
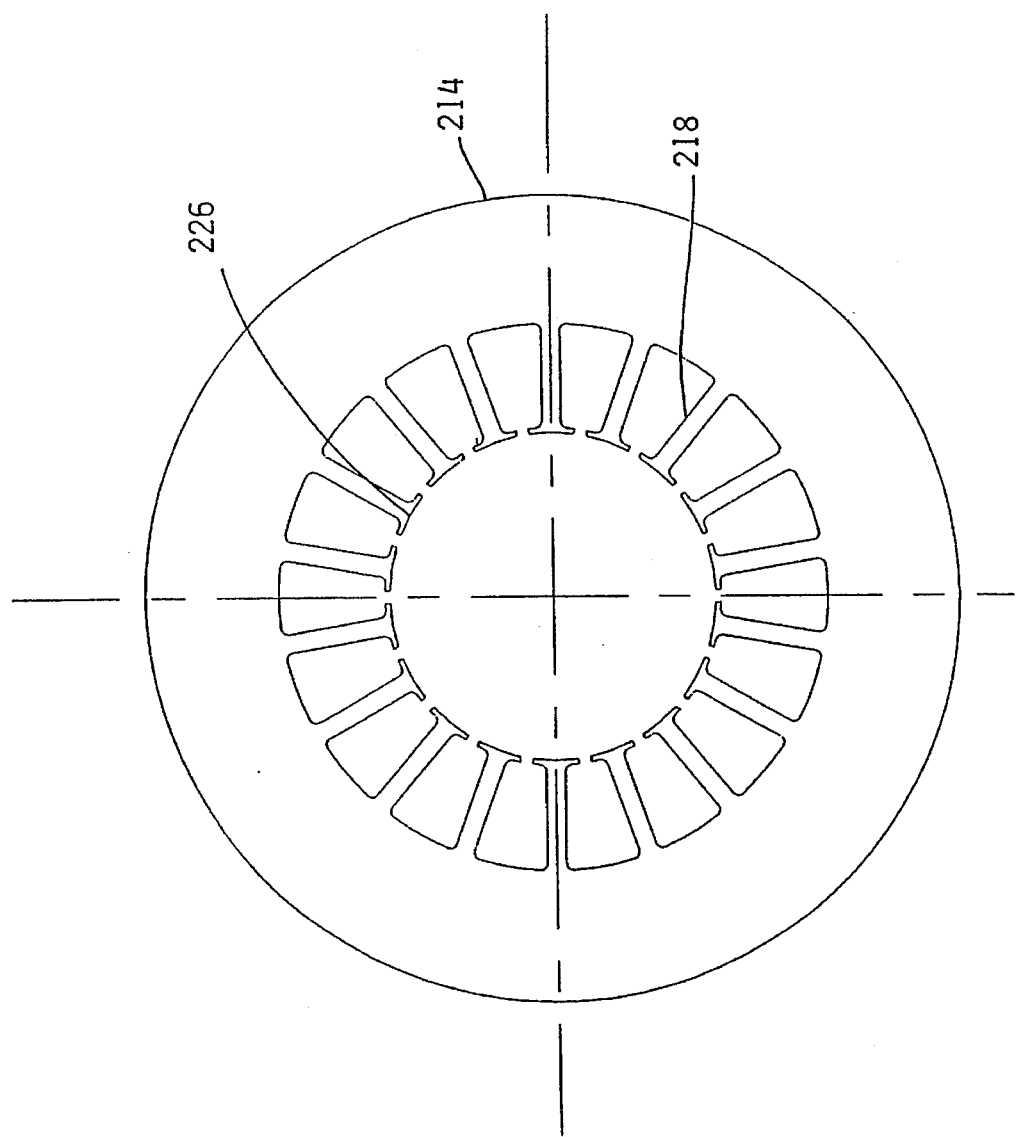
FIG. 4A depicts the thin laminate foils which form the alternator-stator of the present invention.

FIG. 4A shows an individual generally thin flat laminate foil 214 making up the stator body 236. Each foil 214 is made from magnetic steel and about 700 are laminated to form the stator body 236. The flat laminate foil 214 is one of a plurality of stator elements 218, which are directed radially inward having a somewhat T-shaped configuration. A plurality of the flat laminates 214 are stacked together forming a center aperture 226, sized to receive the outer diameter of sleeve 208 of alternator 222. The inner diameter defined by the stator elements 218, and the outer diameter defined by the alternator rotor 222, are sized such that the space between them provides for maximum magnetic coupling, thereby enhancing generator efficiency.

The thin flat laminate foils 214 are stacked together to form the inner core of the alternator-stator 202, and are press-fitted or by the process of heat shrinking are placed within cooling fin body 216, as shown in FIG. 3B. Next, alternator-stator wire 246 is wound around each of T-elements 218 of the foils 214 forming the alternator windings of the alternator-stator 202. The end wire from this wrap hangs free in annular chamber 248 formed between the stator 236 and bearing carrier 230. The 3-phase lead wire 250 connects through the cooling fin body 216 exteriorally for electrical connection. The bearing carrier 230 is located at each end, by being press-fitted into the inner diameter 228 of cooling fin body 216. The alternator rotor 222 is then inserted along a central cylindrical passageway 252, defined by the center aperture 226 of stacked laminates 214 and the air bearing air foil 240.

Figure 4B:
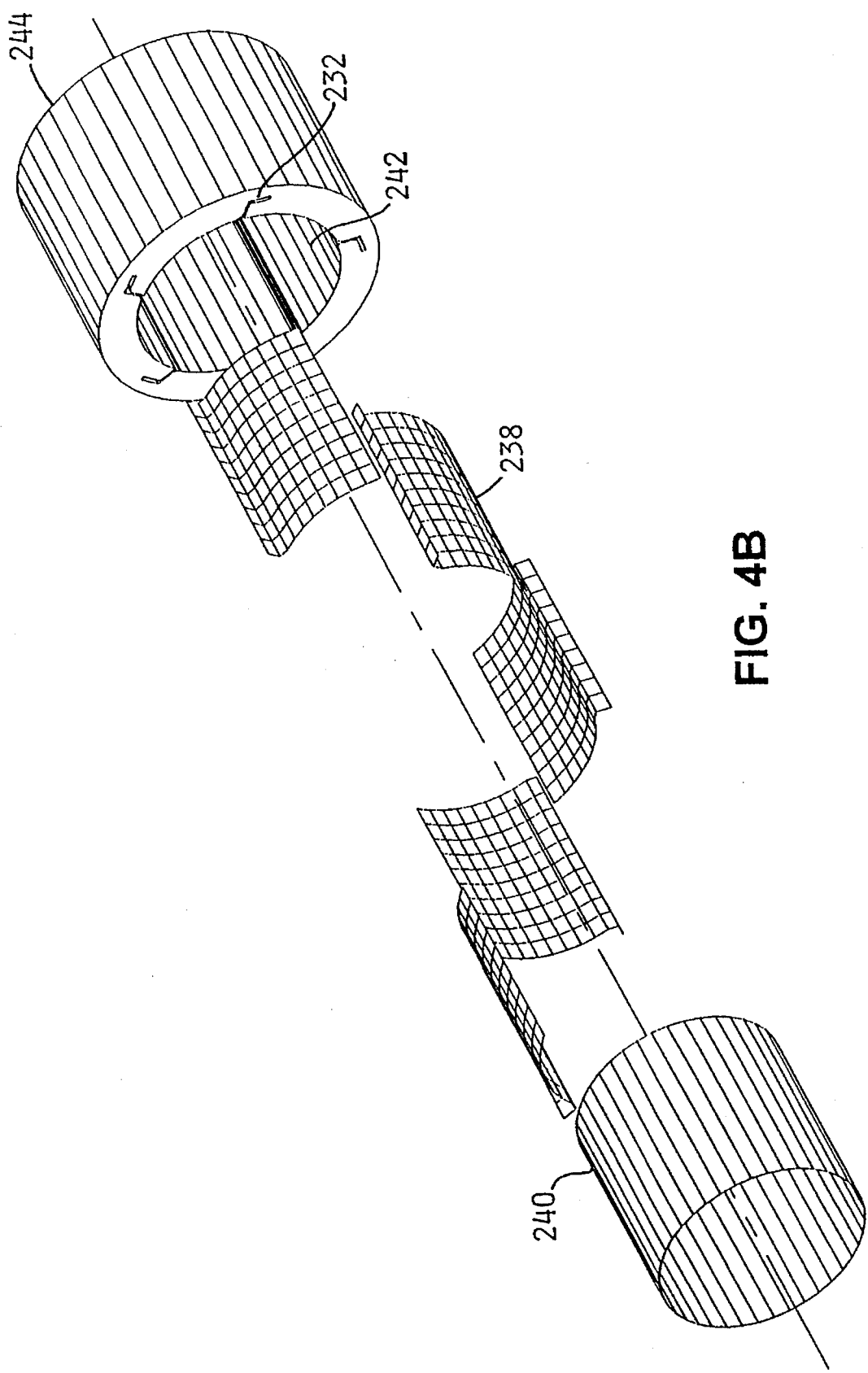
FIG. 4B depicts a compliant foil bearing assembly which supports the alternator-rotor of the present invention.

FIG. 4B shows cylindrically shaped bearing cartridge 244 comprising a cylindrical interior or bore 242 sized to receive cylindrical compliant bearing spring foil 238, upon which cylindrical compliant bearing air foil 240 is overlaid. The bearing housing interior or bore 242, compliant bearing spring foil 238, and compliant bearing air foil 240 are sized to receive and allow for clearance of the alternator rotor 222 upon final assembly and the passage of air during rotation. Bearing carrier 230 has a plurality of air inlets 232, shaped as cylindrical channels or passageways through the bearing carrier 230 body to allow ambient air flow therethrough for cooling foils 238 and 240.

Figure 4C:
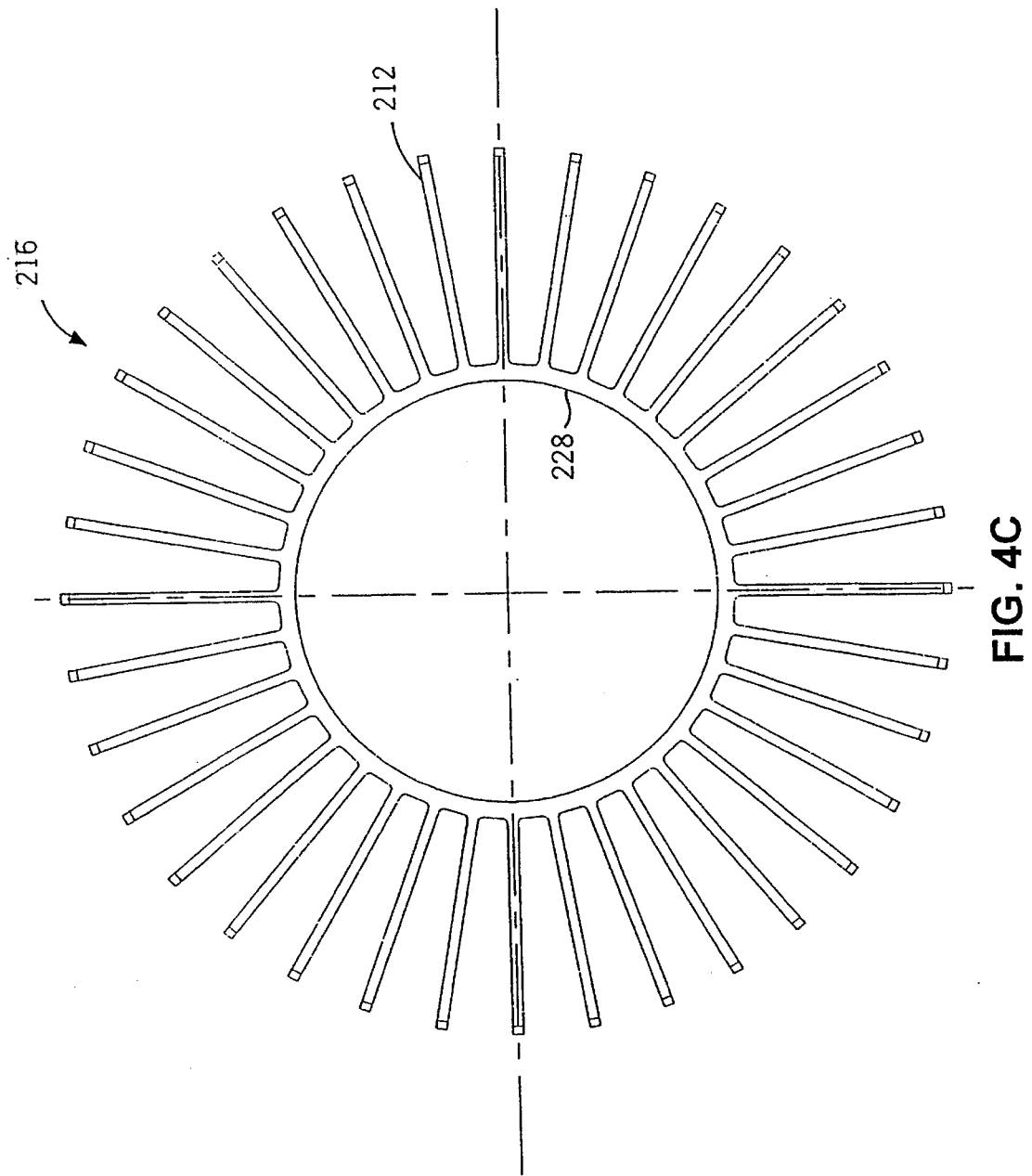
FIG. 4C is an end view of the stator cooling fins of the alternator-stator of the present invention.

FIG. 4C shows cooling fin body 216 having a cylindrical channel bore 228 sized to receive the outer diameter of flat laminate foil 214, and the outer diameter of bearing carrier 230. The cooling fin body 216 further comprises a plurality of outwardly, radially spaced cooling fins 212 that allow for cooling of the rotating assembly 222 when ambient air is passed therealong.

Turbine

Figure 5:
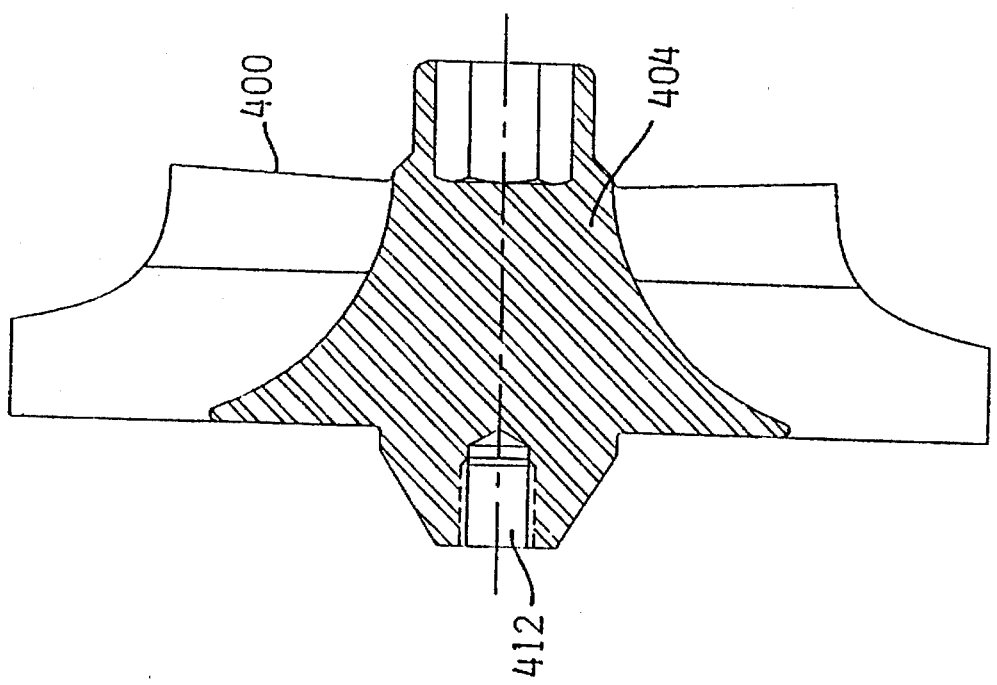
FIG. 5 is a cross-sectional view of the turbine wheel of the present invention.
Figure 5A:
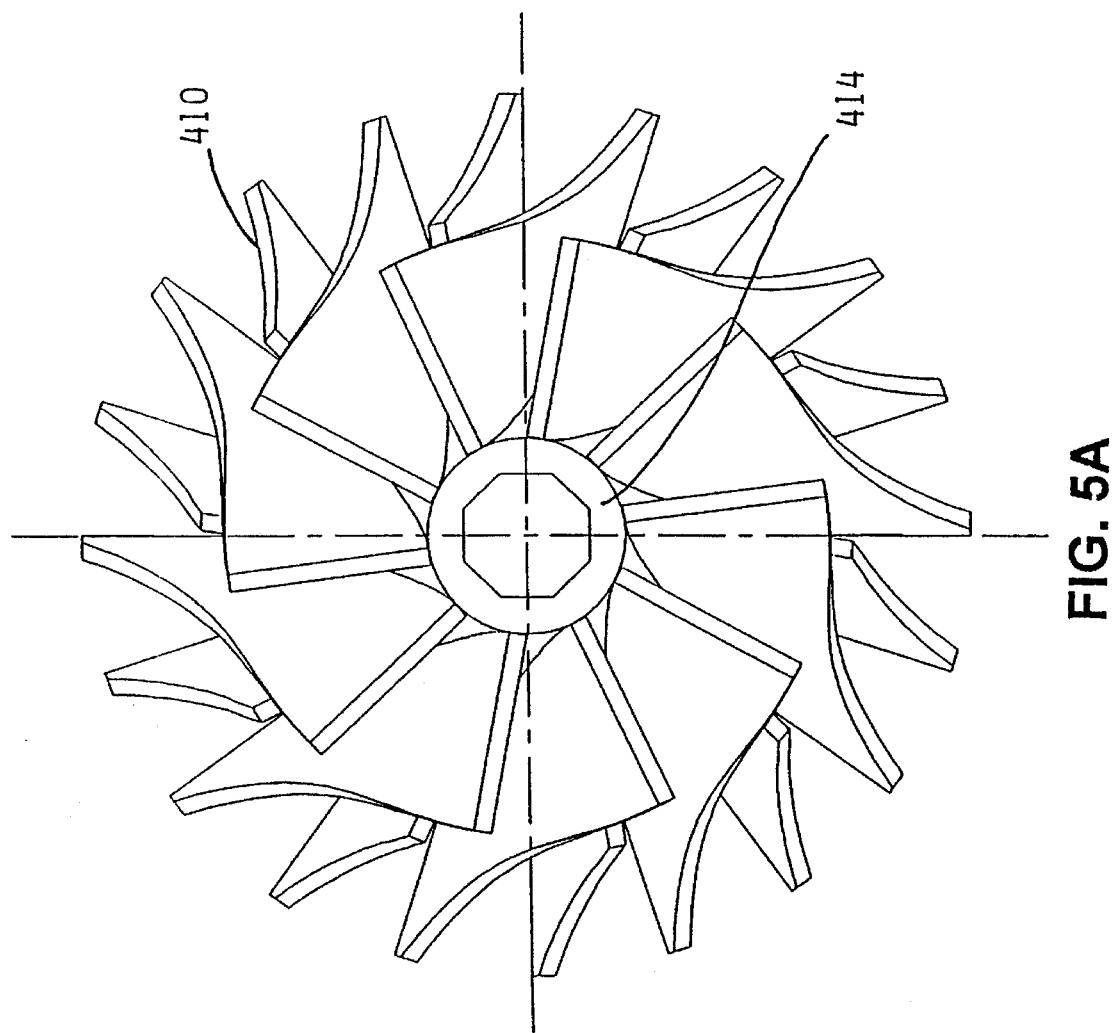
FIG. 5A is an end view, taken along the view line 50—50 of FIG. 5 showing the blades of the turbine wheel.

Referring to FIGS. 5 and 5A turbine wheel 400 has a conventional, radially tapered body 404 and a concentrically located turbine tie-bar bore 412 at one end thereof, for receiving the tie-bar 610 of the rotating assembly 201 as previously described. Turbine wheel 400 further has a plurality of generally triangularly shaped, extending turbine blades 410. Turbine blades 410, which in addition to their triangular shape, allow for a highly efficient rotation of the turbine wheel 400 when the exhaust gases impinge thereupon.

Figure 6:
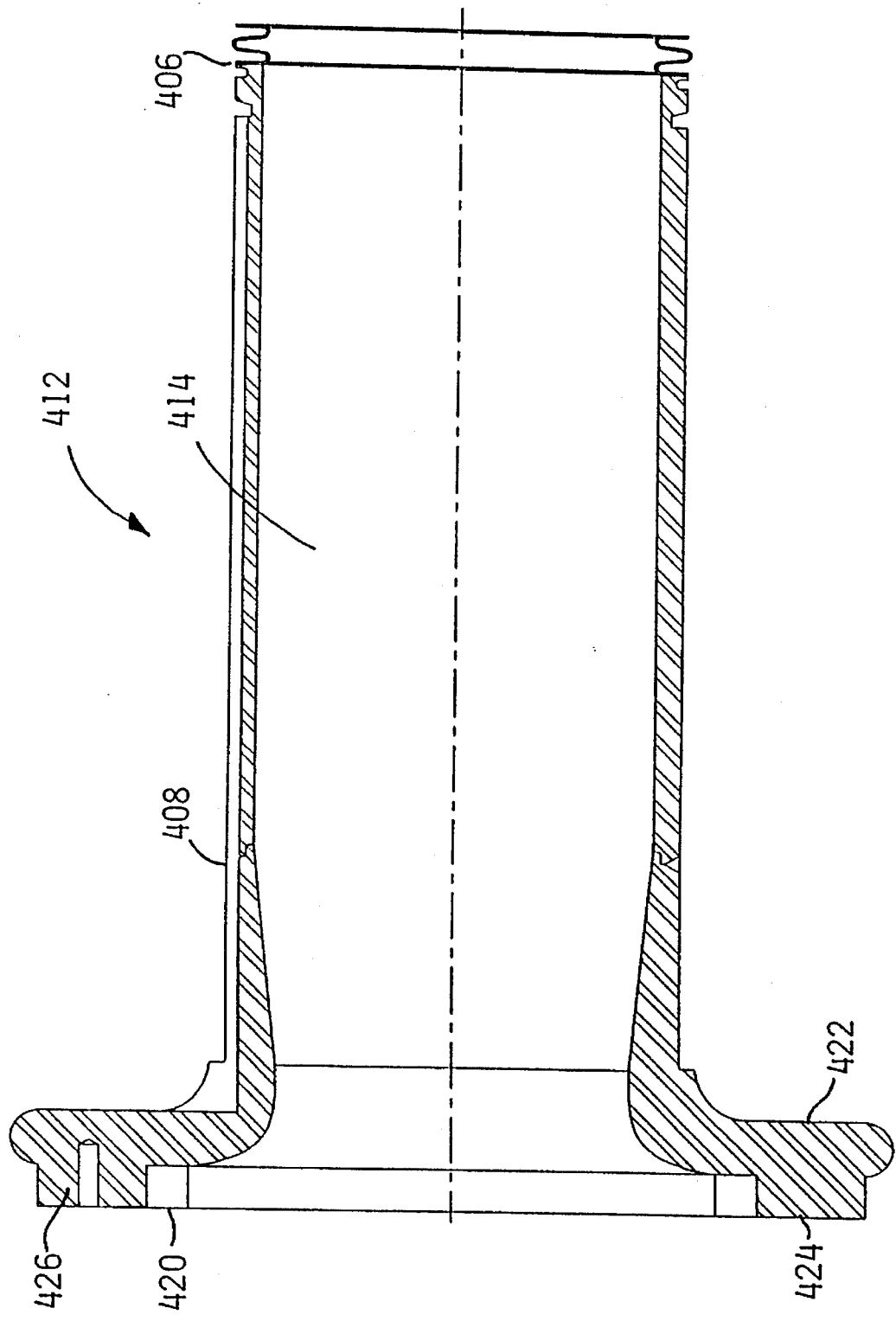
FIG. 6 is a cross-sectional view of the turbine static shroud and exhaust section of the present invention.

As shown in FIG. 6, turbine exhaust member 412 comprises an elongated cylindrical body 408 having a spring retaining groove 406 at one end, and an exhaust gas manifold 422 at an opposite end. The exhaust gas manifold 422 defines an annular cavity 420 having an inner diameter sized to receive turbine wheel 400 and which allows clearance for rotation of turbine blades 410. Between the spring retaining group 406 and exhaust gas manifold 422 is an inner cylindrical channel 414 for passage of the hot combustive exhaust gases into recuperator 110.

FIG. 6A shows the turbine nozzle surface 426 of exhaust gas manifold 422. The nozzle surface 426 defines a plurality of combustor gas inlet passages 416 surrounding the annular cavity 420. The combustor gas inlet passages 416 are formed by a plurality of tear-drop shaped ridges 418. Within the tear-drop shaped ridges 418 are turbine bolt holes 424 for joining the turbine exhaust member 412 to bearing housing 550, as described above.

Bearing Shaft

Figure 7:
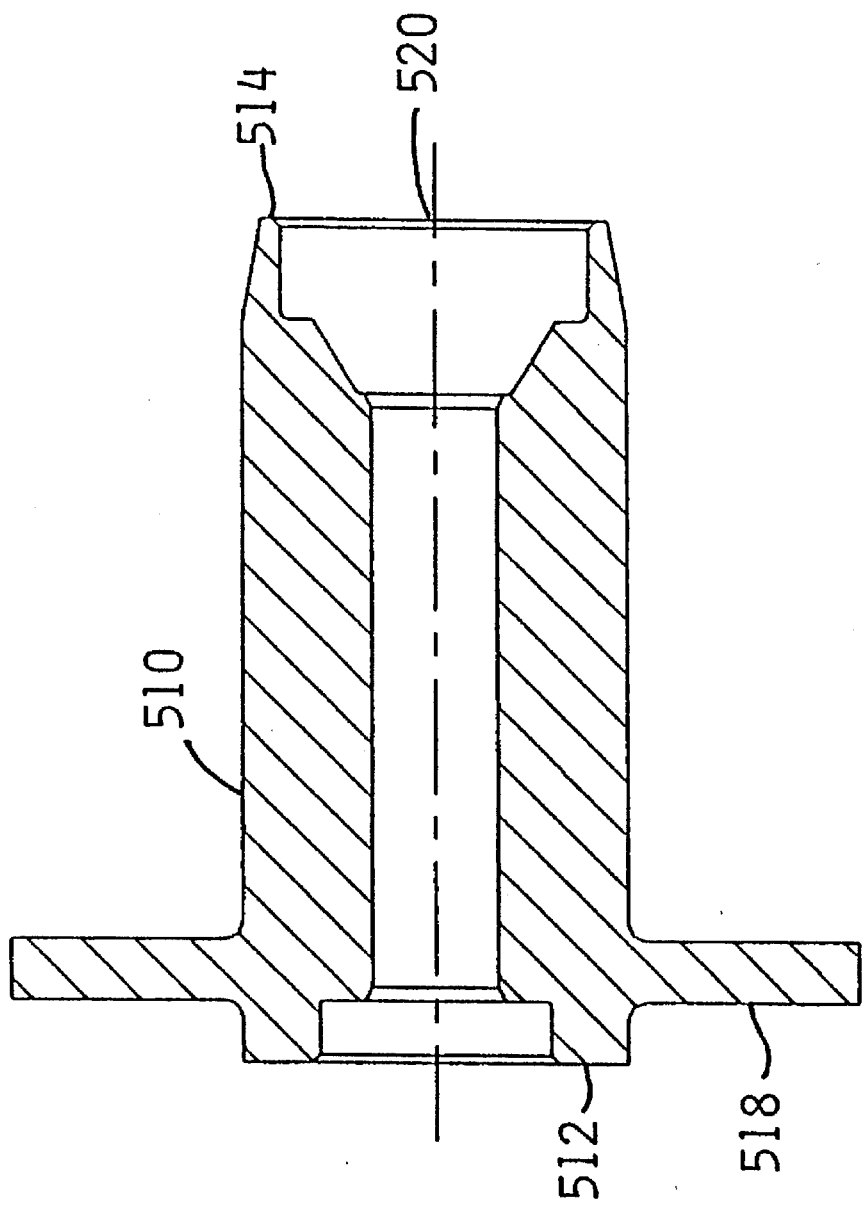
FIG. 7 is a cross-sectional view of the main shaft of the present invention.

FIG. 7 shows the thrust and radial air bearing collar 510 utilized to engage the compressor impeller 312 to the turbine wheel 400 as shown in FIG. 3A. The flanged rotor 510 has a cylindrical channel 520, sized to receive tie-bar 610. As described before, the thrust and radial compliant foil bearing flanged rotor 510 defines a first annular face 512 at one end for engagement with and against the back side of compressor impeller 312, and a second annular face 514 at an opposite end for engagement against the back side of turbine wheel 400. Adjacent to the annular surface 512 is a ring section 518, which rotates between a set of compliant foil thrust bearings 640, not shown.

Figure 7A:
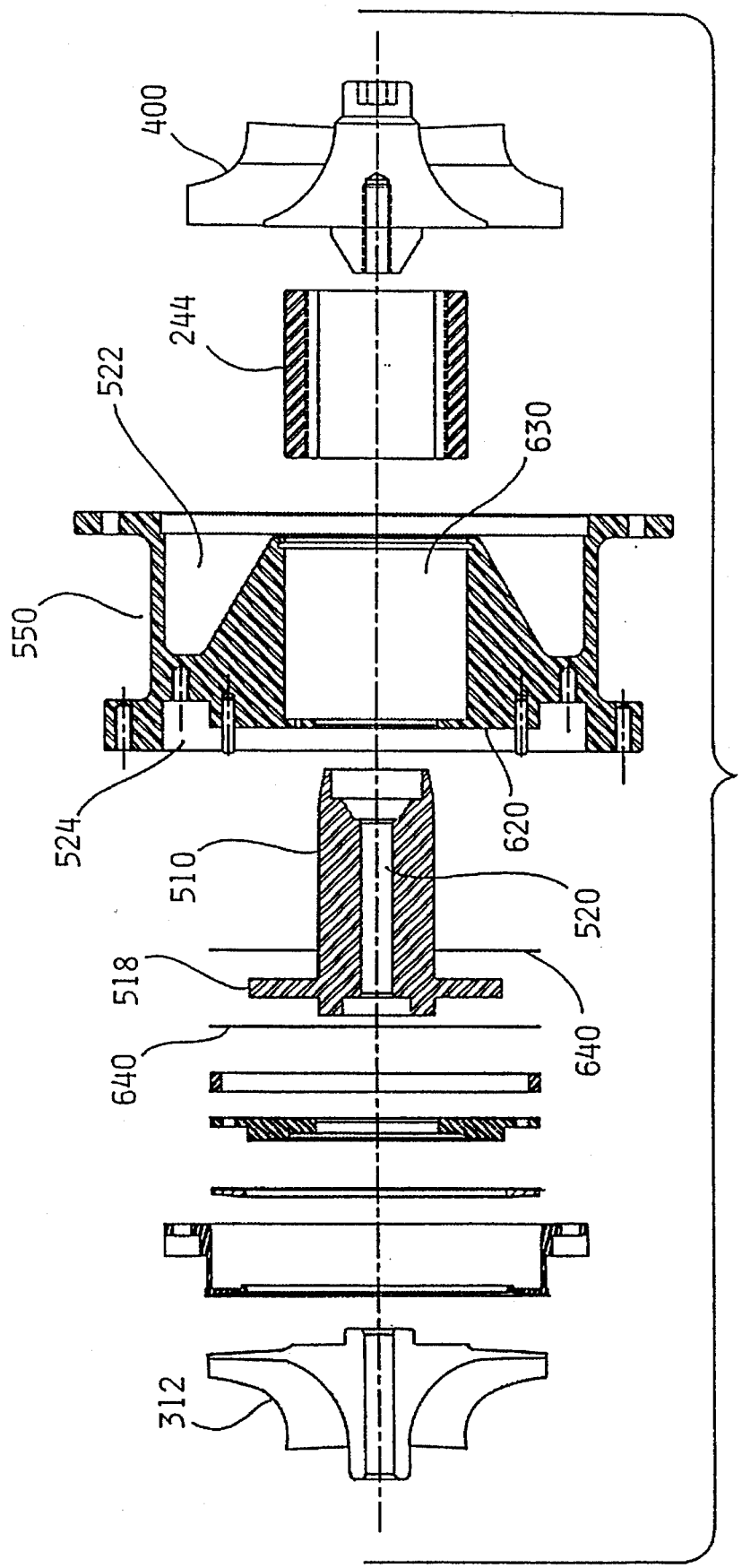
FIG. 7A is an exploded, cross-sectional view of the bearing housing that supports the compliant foil bearings for the main shaft of FIG. 7.

FIG. 7A shows the thrust and radial bearing housing 550, which is bolted between the compressor housing 310 and turbine exhaust member 412, as shown in FIG. 3. The bearing housing 550 is cylindrically shaped having concentrically located cylindrical bore 520 sized to receive the thrust and radial compliant foil bearing cartridge 244, which supports the flanged rotor 510 upon rotation. At the end of the bearing housing 550 that bolts to the turbine housing 412, is a tapered pocket 522 which after assembly acts as a boundary region between the hot exhaust gases and the cold compressed inlet air. At the opposite end of bearing housing 550 that bolts to the compressor housing 310 is an annular groove 524 sized to receive the ring section 518 of the compliant foil thrust assembly. Surface 620 of bearing housing 550 supports one section of the compliant foil thrust bearing assembly and thereby, axially positions flanged rotor 510 by means of flange 518, which in turn establishes the axial position of the rotor group 200 in relationship to the other components.

In a similar fashion, bore 630 positions the radial compliant foil bearing cartridge 244, and thereby radially positions flanged rotor 510, which in turn establishes the basic radial position of the rotor group 200 in relation to the other components. At the outer edges of the bearing housing 550 is a plurality of bolt holes 554 arranged for mounting the bearing housing 550 to the compressor housing 310 and turbine housing 412, as described above.

Combustor

Figure 8:
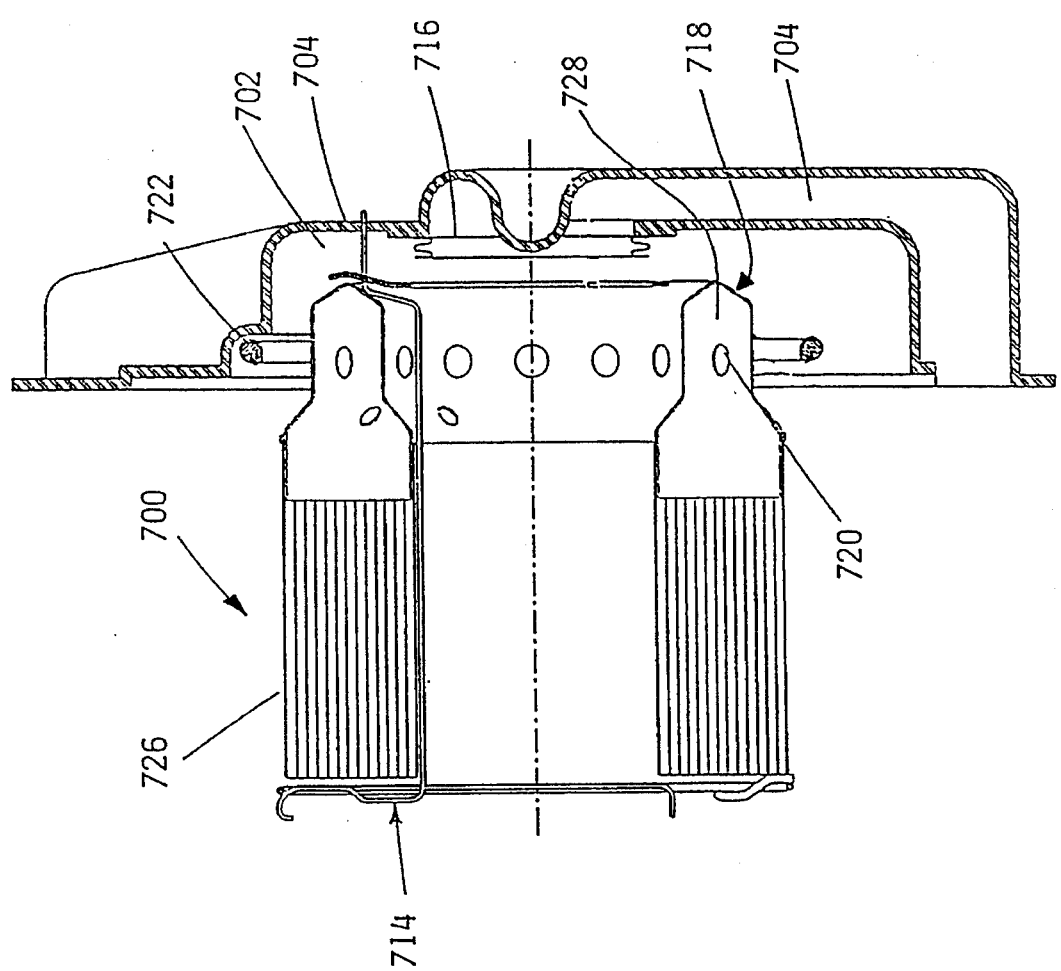
FIG. 8 is a cross-sectional view of the combustor assembly of the present invention.

Shown in FIG. 8 is the modular combustor assembly 700. The combustor assembly 700 comprises a combustor chamber 726, having a thermalcouple assembly 714 on one end, and a combustor cap 724, on an opposite end. Combustor cap 724 engages combustor assembly 700 by a thermal expansion spring 716. Combustor assembly 700 further comprises an annular fuel feed manifold 718 positioned around a combustor mixing chamber 728 comprising a plurality of circular apertures 720, wherein fuel nozzles 722 are located for feeding of fuel to mix with introduced high pressure compressor discharge air. Although not shown, the fuel inlet 722 passes through cover 724. The combustor 726 can be a standard or conventional ignition combustor, or as in the preferred embodiment, a catalytic combustor.

The combustor cover 724 defines a set of manifolds 702 and 704 which form fluid ducts when the combustor assembly 700 is mounted within recuperator 110, as shown in FIG. 1A. In the final mounted condition, manifold 702 forms a chamber which receives the high pressure compressed air from the recuperator 110 to enter the annular fuel feed manifold 718. The channel 704 forms a manifold that receives the hot exhaust gases that flow through the turbine housing 412 and provides a passageway back into recuperator 110. Therefore, the combustor cap 724 is an integrated manifold design which routes the discharged air from the turbine into the recuperator 110 on one end, and provides a flow chamber for the high pressure air leaving the recuperator 110 to enter the combustor 700.

The above described components and their advantages in use will be more particularly appreciated when considering the following mode of operation as a means for improving the efficiency, while maintaining compactness, of a small gas turbine engine used for providing economical electrical power for various applications.

Mode of Operation

Figure 9:
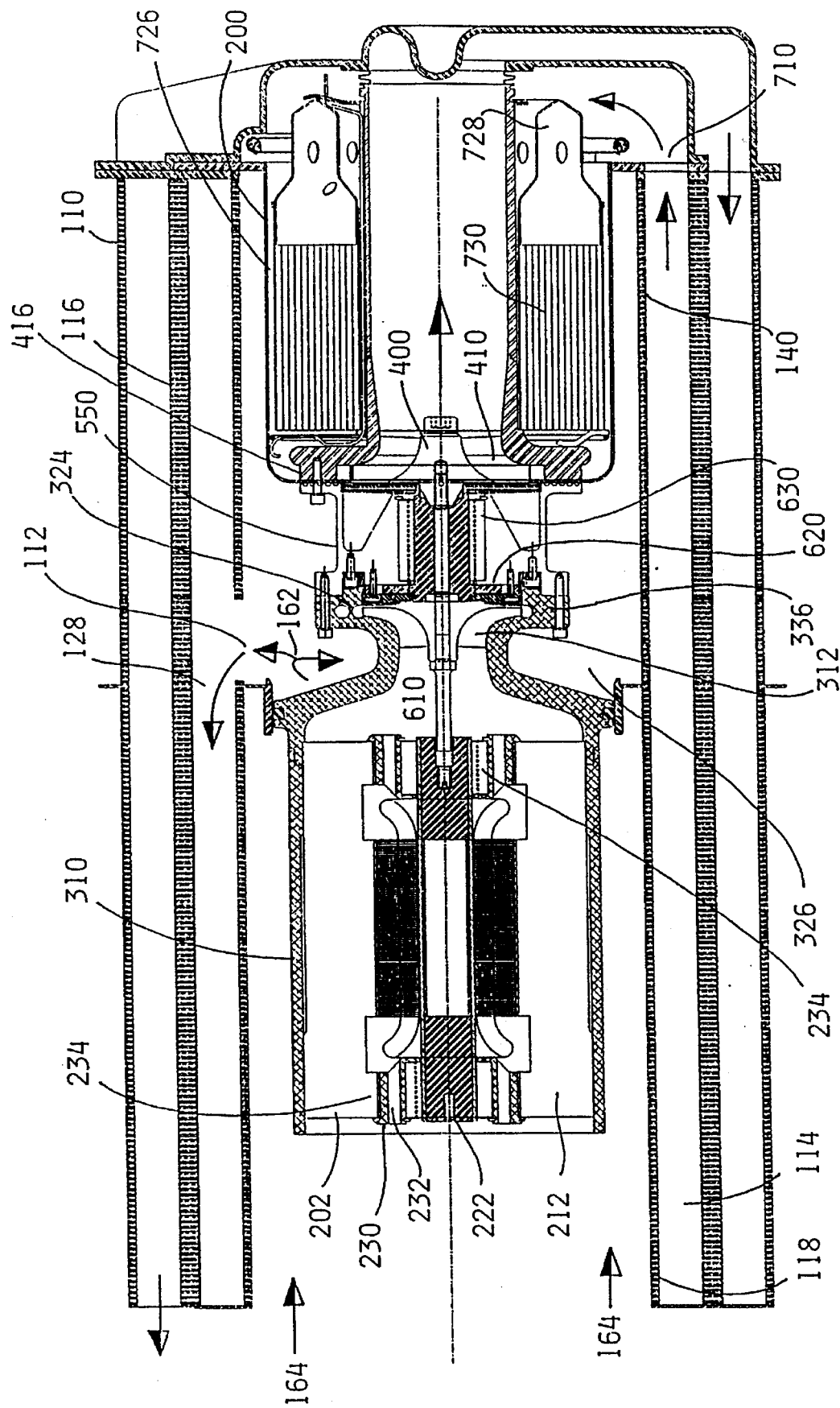
FIG. 9 shows a schematic view of the air-flow path of the engine of the present invention.

For start-up purposes, referring to FIG. 9, the alternator-stator is used as a starter motor to start the gas turbine generator set 100 by electrically rotating compressor impeller 312 and turbine wheel 400. Electrical power is drawn from a battery, not shown. The alternator-stator 202 rotates the compressor impeller 312 at a rotational speed that produces compressed air in the compressor plenum chamber 326 to a temperature of between approximately 60 and 100 degrees Fahrenheit. The catalytic combustor 730 is simultaneously pre-heated electrically by a set of wires located within the combustor chamber 726, and is heated to a temperature such that the compressed air is mixed with a proportional amount of fuel to start the combustion reaction. After the combustive reaction is started, hot combustive gases now impinge on the turbine blades 410 of the turbine wheel 400, thus initiating the normal mode of operation. The alternator-stator 202 now no longer has to electrically drive the alternator rotor 222 and compressor impeller 312. Electrical energy from the battery is now discontinued.

As seen in FIG. 9, compressor inlet air represented by the arrows 164 is drawn in and passed through the alternator-stator 202, through the compressor housing 310 and cooling fins 212, thus keeping the alternator rotor 222 and stator 202 cool. Although in the preferred embodiment this raises the inlet temperature from ambient by approximately nine degrees, it should be appreciated that the power and efficiency losses are less than they would be with a separate fan, bleed air or electric cooling system used in prior art gas turbine engines. Additionally, the compressor inlet air passes through the cartridge carrier inlet holes 232 of the bearing carrier 230, thereby keeping the alternator radial compliant foil bearings 234 cool.

Next, the compressor inlet air 164 is drawn by the rotation of the compressor impeller 312 into the diffuser section 336. The diffuser section 336 channels the high pressure air flow through the compressor outlet passageways 324, thereby forming high pressure turbulent circumferential air flow 162 in the compressor plenum chamber 326. This circumferential highly compressed air in the compressor plenum chamber 326 is used to cool the thrust and radial compliant foil bearing housing 550 which in turn cools the thrust and radial compliant foil bearings 620 and 630. In the preferred embodiment, the pressure ratio is 3:1, wherein 14 psi of ambient air coming through the compressor housing 310 is delivered by the compressor impeller 312 and diffuser section 336 into the compressor plenum chamber 326 at 45 psi. The outlet passageways 324 of the diffuser section 336 is shaped in such a manner that the compressed air is raised to a temperature of approximately 350 degrees Fahrenheit.

Next, the circumferential compressed air 162, within plenum chamber 326, enters the circumferential recuperator 110 through fluid chamber 112, wherein the compressed fluid flow bifurcates into a counter and counter-clockwise path as seen from the arrows 162 view point through the high pressure circumferential path fluid passageway 140 formed within the annular core 118 of recuperator 110. The high pressure bifurcated air flows into inlet aperture 128 and then travels axially along high pressure axial fluid passageway 144, wherein it flows through each high pressure circumferential fluid passageway 140 in a bifurcated direction. The high pressure compressed air now flows in a clock-wise and counter-clockwise direction around the inside of each high pressure circumferential path fluid passageway 140 along the entire annular core 118 of recuperator 110.

The compressed air is heated up in heat exchange relationship by the adjoining low pressure circumferential fluid passageways 116 containing the hot exhaust gases. These hot exhaust gases in the low pressure circumferential fluid passageways 116 flow in a likewise clockwise and counter-clockwise direction but are opposite in direction from the flow of the high pressure gases, so that the heat exchanger is in true counterflow.

The heated, compressed air from the circumferential recuperator 110 is then conducted via annular combustor chamber 710 to combustor 700. In the preferred embodiment, the compressed air has been heated to a temperature of approximately 1000 degrees Fahrenheit. The hot compressed air exiting the combustor chamber 710 flows circumferentially within the combustor mixing chamber 728 with fuel from a fuel tank [not shown], wherein the high circumferential turbulence efficiently mixes and vaporizes the fuel within the air, providing an air/fuel mixture within combustor mixing chamber 728 that is then delivered into the combustor chamber 726.

In the preferred embodiment, the combustor is a catalytic combustor 730. There is no flame as in conventional combustors generated by this type of combustor. Fuel and air react with the catalyst at approximately 1500 degrees Fahrenheit, or below the threshold where significant NOx is formed. The catalytic combustor 730 has an air/fuel ratio of approximately 153:1, so combustion is virtually complete, thus reducing the formation of pollutants such as CO and HCs. The catalytic combustor 730 in the preferred embodiment combusts the air/fuel mixture producing the hot motive combustion gases at a temperature of approximately 1500 degrees Fahrenheit. The primary fuel in the preferred embodiment is unleaded gas, which is inexpensive and offers low emissions. However, the combustor can also use butane, propane, ethanol, methanol/ethanol mixtures and gasohol without change.

Hot combusted gases from combustor 700 are then directed into turbine wheel 400 through inlet passages 416 where they impinge upon the turbine blades 410, producing rotational output power which imparts energy to drive the compressor impeller 300 and alternator rotor 222.

The turbine wheel 400, compressor impeller 300 and alternator rotor 222 rotate on the common shaft 610, supported by the double acting compliant foil thrust bearings 620, a thrust compliant foil radial bearing 640 and two compressor radial compliant foil bearings 234. In the preferred embodiment, rotating group 200 rotates at 96,000 rpm, generating 24 kilowatts of continuous electrical energy by the alternator-stator 202, for delivery by alternator-stator lead 250 to the outside environment.

When the rotating group 200 rotates at 96,000 rpm, the quill shaft 612 of tie-bar 610 acts as an alignment means for the turbine wheel 400, compressor impeller 300 and alternator rotor 222 to find a common center axis of rotation. The quill shaft 612 at 96,000 rpm becomes flexible and replaces the two-part spline used in conventional turbine engines.

The O-ring 320 of rotating assembly 201 and thermal expansion spring 716 of combustor 700 provide a means in which the rotating group 200 is able to slide as it expands thermally as a means for off loading thermal stress. Furthermore, the O-ring 320 provides a sealing means for the compressor plenum chamber 326, therefore eliminating the normal volute or scroll used to contain the compressor discharge air in prior gas turbine engine designs.

In operation, the rotating group 200 is very simple and inexpensive. It is not dissimilar to that of a turbocharger, with a generator on one end. As mentioned before, the gas turbine generator set 100 is modular in design and comprises of a single stage centrifugal compressor impeller 300, a single stage radial turbine wheel 400 and a permanent magnet alternator rotor 222, mounted on a common shaft 610.

In the preferred embodiment, the rotating group 200 is designed to have a speed of 96,000 rpm resulting in an engine efficiency of 30%. At part load, the speed may be reduced which tends to reduce power more by lowering the pressure ratio, and mass flow then by lowering the turbine inlet temperature as required in prior art designs. This results in substantially higher part load efficiency. As an example, at one third load, the efficiency only drops from 30% to 25%.

There has been described and illustrated herein an improved gas turbine generator set. While particular embodiments of the invention have been described, it is not intended that the invention be limited exactly thereto, as it is intended that the invention be as broad in scope as the art will permit. The foregoing description and drawings will suggest other embodiments and variations within the scope of the claims to those skilled in the art, all of which are intended to be included in the spirit of the invention as herein set forth.

What is claimed is:

1. In an energy source comprising a combustor, turbine, compressor, motor-generator and recuperator, the improvement comprising a recuperator surrounding all of the other said elements so as to provide sound and supplemental centrifugal fly apart protection relative to the ambient space surrounding said energy source; wherein said recuperator elements comprise a plurality of thin boundary foils, said boundary foils defining a center aperture and a plurality of first ellipsoidal shaped apertures adjacent said central aperture, and a plurality of second ellipsoidal shaped apertures, adjacent to and in-line with said first ellipsoidal shaped apertures, said foils having hemispheric embossments on a first side and are dimpled on the opposite side.

2. An energy source according to claim 1, wherein said boundary foils are stacked side-by-side with a plurality of inner and outer rings placed therebetween, each said stacked boundary foil is stacked in such a manner that the embossed faces make contact with one another, forming low pressure circumferential path fluid gas passageways and high pressure path fluid gas passageways.

3. An energy source according to claim 2 wherein said foils define embossed ridges around said center aperture and said first and second ellipsoidal apertures, said foils stacked side-by-side wherein each said foil is stacked in such a manner that the embossed faces make contact with one another forming low pressure circumferential path fluid gas passageways and high pressure path fluid gas passageways.

4. A recuperated turbine power plant comprising: a turbine means including generator, compressor, combustor, and turbine sections for intaking and compressing ambient air, combusting said compressed air with fuel to produce hot gases, and expanding said hot gasses to rotationally drive said turbine and generator; recuperator means for preheating said compressed ambient air prior to combustion in heat exchange relationship with said expanded turbine exhaust gases, said recuperator means including an annular core section receiving circumferentially said compressed ambient air and said combustion gases internally to said annular core, said annular core defined by a stacked plurality of generally thin stamped boundary foils, each of said boundary foils having substantially hemispheric embossments on a first side and including a plurality of inlet and outlet passageways, each of said passageways bordered by a ridge, wherein said foils are stacked by alternately sandwiching circumferentially aligned exhaust cavities with circumferentially aligned air cavities, in heat exchange relationship, said hemispheric embossments contacting each other forming a first bifurcated circumferential flow path wherein said turbine exhaust combustion gases flow circumferentially and forming a second bifurcated circumferential flow path wherein said compressed ambient air flows circumferentially providing heat exchange therebetween.

* * * * *